(12) United States Patent
Cotton et al.

(10) Patent No.: US 10,393,599 B2
(45) Date of Patent: Aug. 27, 2019

(54) DEFORMABLE APPARATUS AND METHOD

(71) Applicant: Nokia Technologies Oy, Espoo (FI)

(72) Inventors: Darryl Cotton, Hemmingford Grey (GB); Adam Robinson, Cambridge (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/517,933

(22) PCT Filed: Sep. 23, 2015

(86) PCT No.: PCT/FI2015/050635
§ 371 (c)(1),
(2) Date: Apr. 7, 2017

(87) PCT Pub. No.: WO2016/059288
PCT Pub. Date: Apr. 21, 2016

(65) Prior Publication Data
US 2017/0307453 A1    Oct. 26, 2017

(30) Foreign Application Priority Data

Oct. 16, 2014 (EP) ..................................... 14189254

(51) Int. Cl.
*G01L 1/14* (2006.01)
*G01M 5/00* (2006.01)
*G01L 5/10* (2006.01)

(52) U.S. Cl.
CPC ................ *G01L 1/14* (2013.01); *G01L 1/142* (2013.01); *G01L 5/103* (2013.01); *G01M 5/0083* (2013.01)

(58) Field of Classification Search
None
See application file for complete search history.

(56) References Cited

U.S. PATENT DOCUMENTS

| | | | |
|---|---|---|---|
| 6,532,824 B1 | 3/2003 | Ueno et al. |
| 7,395,717 B2 | 7/2008 | DeAngelis et al. |
| 8,161,826 B1 | 4/2012 | Taylor |
| 8,332,053 B1 | 12/2012 | Patterson et al. |

(Continued)

FOREIGN PATENT DOCUMENTS

| | | |
|---|---|---|
| CN | 1157594 C | 7/2004 |
| EP | 1113252 | 7/2001 |

(Continued)

OTHER PUBLICATIONS

Office Action received for corresponding European Patent Application No. 15153847.7, dated May 10, 2017, 6 pages.

(Continued)

*Primary Examiner* — Jamel E Williams
(74) *Attorney, Agent, or Firm* — Alston & Bird LLP

(57) ABSTRACT

An apparatus and method wherein the apparatus comprises: a deformable substrate; a curved support structure; at least one support configured to space the curved support structure from the substrate so that when the deformable substrate is deformed the curved support structure is not deformed in the same way; and a capacitive sensor comprising a protruding electrode capacitively coupled to an overlaying electrode; wherein the protruding electrode protrudes from a side of the curved support structure.

18 Claims, 13 Drawing Sheets

(56) References Cited

U.S. PATENT DOCUMENTS

Figure 1:
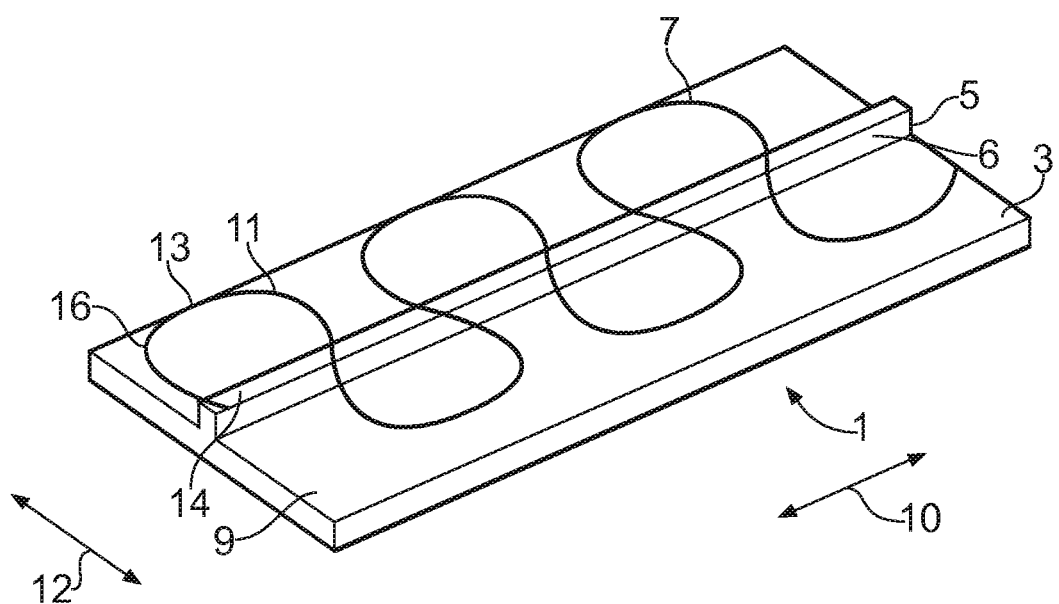

| | | | |
|---|---|---|---|
| 2002/0094701 A1* | 7/2002 | Biegelsen | B25J 13/084 439/32 |
| 2002/0197002 A1* | 12/2002 | Lin | B81B 3/0008 385/18 |
| 2004/0016568 A1 | 1/2004 | Palanisamy | |
| 2006/0286785 A1 | 12/2006 | Rogers et al. | |
| 2007/0029671 A1 | 2/2007 | Yamasaki | |
| 2008/0149372 A1* | 6/2008 | Choi | G11C 5/04 174/254 |
| 2009/0158856 A1 | 6/2009 | Harish et al. | |
| 2010/0140785 A1 | 6/2010 | Killer et al. | |
| 2010/0143848 A1* | 6/2010 | Jain | B81C 1/0019 430/315 |
| 2010/0162824 A1 | 7/2010 | Jamshidi et al. | |
| 2010/0307238 A1 | 12/2010 | Van Popta et al. | |
| 2010/0330338 A1 | 12/2010 | Boyce et al. | |
| 2011/0309526 A1 | 12/2011 | Cho et al. | |
| 2012/0051005 A1* | 3/2012 | Vanfleteren | H01L 21/565 361/749 |
| 2012/0052268 A1* | 3/2012 | Axisa | H01L 23/49838 428/212 |
| 2012/0069584 A1* | 3/2012 | Kawabe | H05K 1/189 362/382 |
| 2013/0027344 A1 | 1/2013 | Choon | |
| 2013/0041235 A1 | 2/2013 | Rogers et al. | |
| 2013/0256004 A1 | 10/2013 | Cotton et al. | |
| 2013/0320467 A1* | 12/2013 | Buchanan | G01N 29/022 257/419 |
| 2014/0022746 A1 | 1/2014 | Hsu | |
| 2014/0039290 A1 | 2/2014 | De Graff et al. | |
| 2014/0321126 A1 | 10/2014 | Narag et al. | |

FOREIGN PATENT DOCUMENTS

| | | | |
|---|---|---|---|
| EP | 1783555 A2 | 5/2007 | |
| GB | 2524327 A | 9/2015 | |
| JP | 2005-235997 A | 9/2005 | |
| JP | 2006-005026 A | 1/2006 | |
| JP | 2007-250998 A | 9/2007 | |
| KR | 2008-0043068 A | 5/2008 | |
| WO | WO 2005/121812 A1 | 12/2005 | |
| WO | 2013/019510 A1 | 2/2013 | |
| WO | 2013/144738 A3 | 10/2013 | |
| WO | 2013/144788 A1 | 10/2013 | |
| WO | 2013/149181 A1 | 10/2013 | |
| WO | 2014/124049 A2 | 8/2014 | |
| WO | WO 2014124049 A2 * | 8/2014 | H01L 23/145 |

OTHER PUBLICATIONS

Sekitani et al., "Stretchable Active-Matrix Organic Light-emitting Diode Display Using Printable Elastic Conductors", Nature Materials, vol. 8, Jun. 2009, 23 pages.

Lu et al., "Delamination of Stiff Islands Patterned on Stretchable Substrates", International Journal of Materials Research, vol. 98, No. 8, Aug. 2007, pp. 717-722.

Sluis et al., "Stretching Induced Interconnect Delamination in Stretchable Electronic Circuits", Journal of Physics D: Applied Physics, vol. 44, No. 3, 2011, pp. 1-19.

Cheng et al., "Analysis of a Concentric Coplanar Capacitor for Epidermal Hydration Sensing", Sensors and Actuators A: Physical, vol. 203, 2013, pp. 149-153.

Kim et al., "Epidermal electronics", Science, vol. 333, No. 6044, 2011, pp. 838-843.

Cotton et al., "A multifunctional capacitive sensor for stretchable electronic skins", IEEE Sensors Journal, vol. 9, No. 12, 2009, 2 Pages.

Cai et al., "Super-stretchable, Transparent Carbon Nanotube-Based Capacitive Strain Sensors for Human Motion Detection", Scientific Reports, vol. 3, No. 3048, 2013, pp. 1-9.

Cheng et al., "A Polymer-based Capacitive Sensing Array for Normal and Shear Force Measurement", Sensors, vol. 10, No. 11, 2010, pp. 10211-10225.

Roberts et al., "Soft-matter Capacitive Sensor for Measuring Shear and Pressure Deformation" IEEE International Conference on Robotics and Automation, 2013, pp. 3529-3534.

Gutruf et al., "Strain Response of Stretchable Micro-Electrodes: Controlling Sensitivity With Serpentine Designs and Encapsulation", Applied Physics Letters, vol. 104, No. 2, Jan. 2014, pp. 1-4.

Search Report received for corresponding United Kingdom Patent Application No. 1405081.9, dated Aug. 14, 2014, 3 pages.

Chortos et al., "Highly Stretchable Transistors Using a Microcracked Organic Semiconductor", Advanced Materials, vol. 26, No. 25, Jul. 2014, pp. 4253-4259.

Lee et al., "Stretchable Graphene Transistors With Printed Dielectrics and Gate Electrodes", Nano Letters, vol. 11, Oct. 5, 2011, pp. 4642-4646.

Xu et al., "Highly Stretchable Carbon Nanotube Transistors With Ion Gel Gate Dielectrics", Nano Letters, vol. 14, Jan. 1, 2014, 17 pages.

Chae et al., "Transferred Wrinkled Al2O3 for Highly Stretchable and Transparent Graphene-carbon Nanotube Transistors", Nature Materials, vol. 12, May 2013, pp. 403-409.

Graz et al., "Silicone Substrate With In Situ Strain Relief for Stretchable Thin-film Transistors", Applied Physics Letters, vol. 98, No. 12, Mar. 2011, pp. 124101-1-124101-3.

Robinson et al., "Hybrid Stretchable Circuits on Silicone Substrate", Journal of Applied Physics, vol. 115, No. 4, Apr. 2014, pp. 143511-1-143511-5.

Extended European Search Report received for corresponding European Patent Application No. 14189254.7, dated Apr. 23, 2015, 4 pages.

Extended European Search Report received for corresponding European Patent Application No. 14189248.9, dated May 4, 2015, 9 pages.

Forsberg et al., "Heterogeneous 3D Integration of 17 m Pitch Si/SiGe Quantum Well Bolometer Arrays for Infrared Imaging Systems", Journal of Micromechanics and Microengineering, vol. 23, No. 4, Mar. 6, 2013, pp. 1-8.

International Search Report and Written Opinion received for corresponding Patent Cooperation Treaty Application No. PCT/FI2015/050131, dated Jun. 9, 2015, 12 pages.

International Search Report and Written Opinion received for corresponding Patent Cooperation Treaty Application No. PCT/FI2015/050680, dated Feb. 3, 2016, 15 pages.

Extended European Search Report received for corresponding European Patent Application No. 15153847.7, dated Feb. 3, 2016, 10 pages.

International Search Report and Written Opinion received for corresponding Patent Cooperation Treaty Application No. PCT/FI2015/050635, dated Nov. 20, 2015, 10 pages.

Office Action for Chinese Application No. 201580067853.X dated Aug. 28, 2018, 9 pages.

* cited by examiner

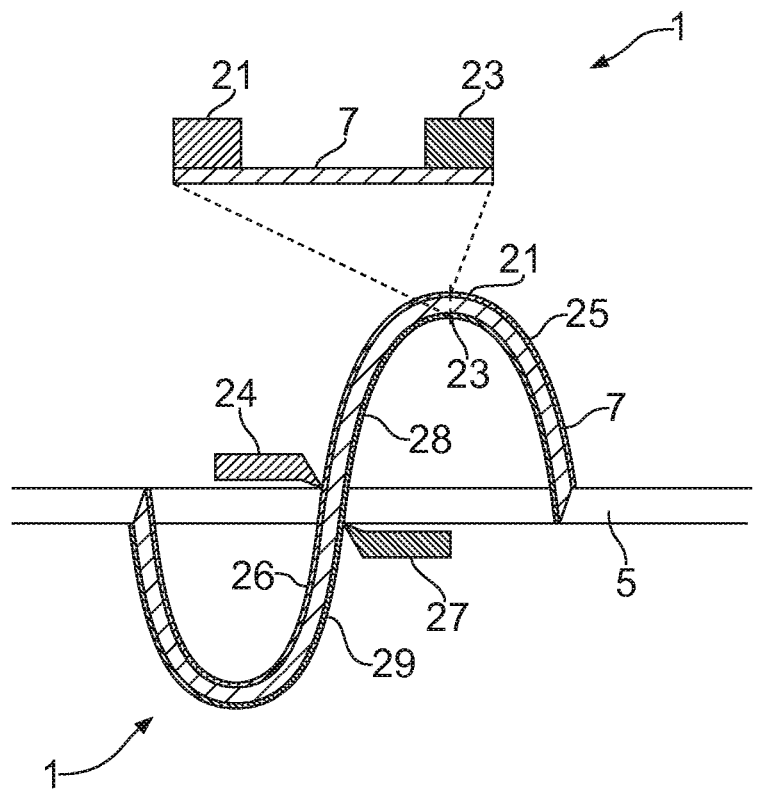
FIG. 2B
FIG. 2A
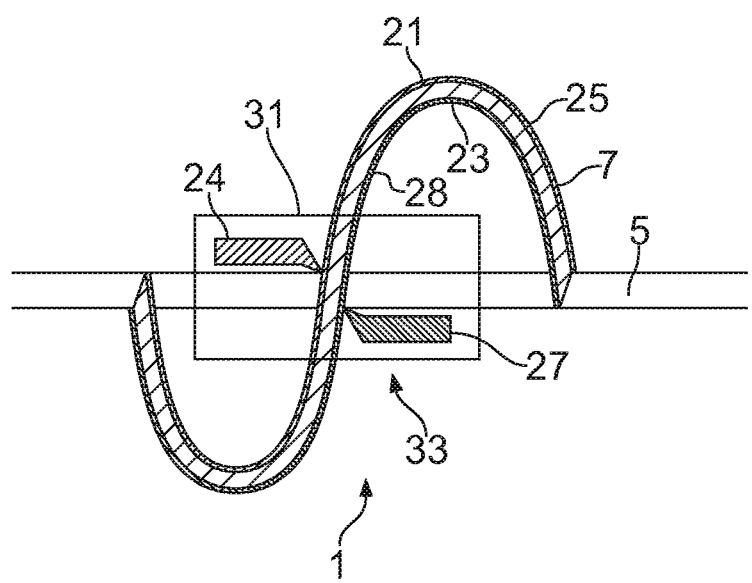
FIG. 3

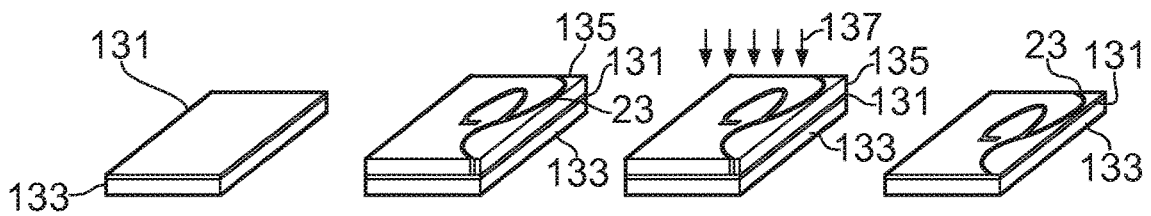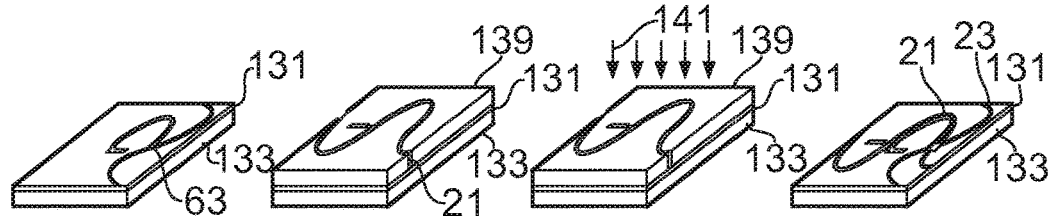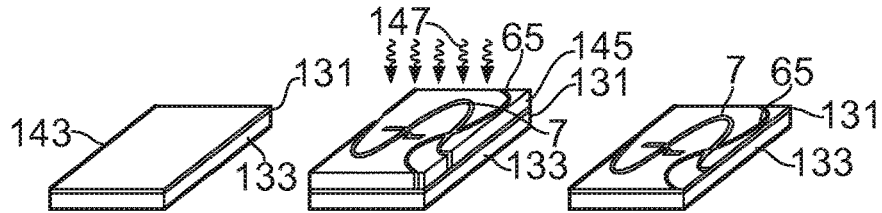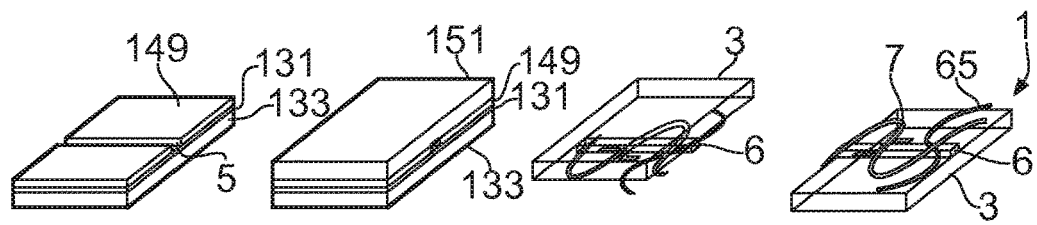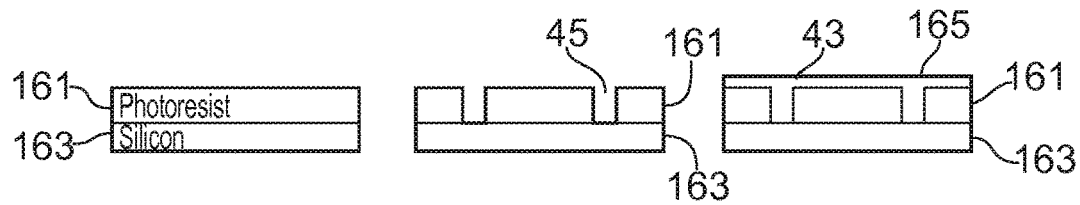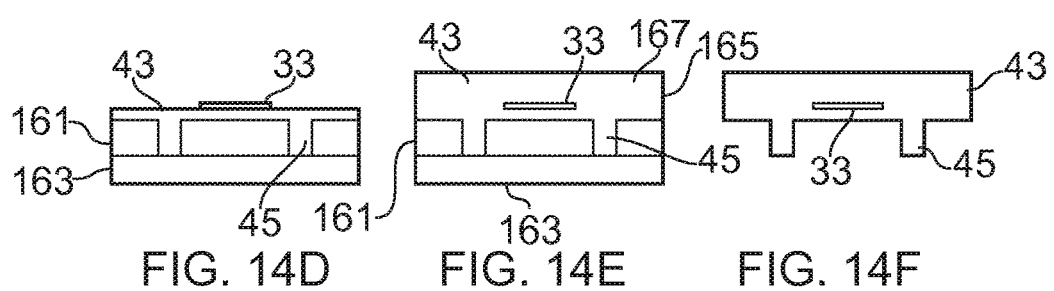

DEFORMABLE APPARATUS AND METHOD

RELATED APPLICATION

This application was originally filed as PCT Application No. PCT/FI2015/050635 filed Sep. 23, 2015, which claims priority benefit from EP Patent Application No. 14189254.7 filed Oct. 16, 2014.

TECHNOLOGICAL FIELD

Examples of the present disclosure relate to a deformable apparatus and method. In particular, they relate to a deformable apparatus and method wherein the apparatus comprises sensors configured to detect when the apparatus is deformed.

BACKGROUND

Deformable electronic devices are known. For instance, wearable electronic devices, biological sensor devices or deformable communication devices or any other suitable devices may be configured to be deformed in response to a force applied to the device.

In such devices it may be beneficial to enable the amount of deformation to be detected and/or measured. It may be beneficial to enable different types of deformation of the device to be detected and/or measured.

BRIEF SUMMARY

According to various, but not necessarily all, examples of the disclosure, there may be provided an apparatus comprising: a deformable substrate; a curved support structure; at least one support configured to space the curved support structure from the substrate so that when the deformable substrate is deformed the curved support structure is not deformed in the same way; and a capacitive sensor comprising a protruding electrode capacitively coupled to an overlaying electrode; wherein the protruding electrode protrudes from a side of the curved support structure.

In some examples the apparatus may comprise a plurality of capacitive sensors comprising a protruding electrode capacitively coupled to an overlaying electrode. Different capacitive sensors within the apparatus may be configured to detect different types of deformation of the apparatus.

In some examples the capacitive sensor may comprise a first protruding electrode and a second protruding electrode and both the first protruding electrode and the second protruding electrode are capacitively coupled to the overlaying electrode. In some examples a first protruding electrode may protrude from a first side of the curved support structure and a second protruding electrode may protrude from a second side of the curved support structure. In other examples a first protruding electrode may protrudes from a first side of the curved support structure and a second protruding electrode may also protrude from the first side of the curved support structure.

In some examples the first and second protruding electrodes may be provided in the same plane.

In some examples the overlaying electrode may be provided in a different plane to the first protruding electrode and second protruding electrode.

In some examples the protruding electrodes may be suspended over the deformable substrate.

In some examples the overlaying electrode may be embedded in an overlaying elastomeric layer.

In some examples the overlaying electrode may be larger than the first protruding electrode and the second protruding electrode.

In some examples the overlaying electrode may be rigid.

In some examples the overlaying electrode may be deformable.

In some examples the deformable substrate may form a cavity in which the curved support structure and protruding electrode are provided.

In some examples a radius of curvature of the curved support structure may be parallel to a plane of the deformable substrate.

In some examples the curved support structure may have a serpentine shape. The serpentine shape may comprise a plurality of loops such that a loop which extends to a left hand side is followed by a loop which extends to a right hand side.

In some examples the deformable substrate may be configured to be deformed in response to a force applied by a user.

According to various, but not necessarily all, examples of the disclosure, there may be provided an electronic device comprising an apparatus as described above.

According to various, but not necessarily all, examples of the disclosure, there may be provided method comprising: providing a deformable substrate; providing a curved support structure; providing at least one support configured to space the curved support structure from the deformable substrate so that when the deformable substrate is deformed the curved support structure is not deformed in the same way; and providing a capacitive sensor comprising a protruding electrode capacitively coupled to an overlaying electrode; wherein the protruding electrode protrudes from a side of the curved support structure.

In some examples the method may further comprise providing a plurality of capacitive sensors comprising a protruding electrode capacitively coupled to an overlaying electrode. In some examples different capacitive sensors within the apparatus may be configured to detect different types of deformation of the apparatus.

In some examples the capacitive sensor may comprises a first protruding electrode and a second protruding electrode and both the first protruding electrode and the second protruding electrode may be capacitively coupled to the overlaying electrode. In some examples the first protruding electrode may protrude from a first side of the curved support structure and a second protruding electrode protrudes from a second side of the curved support structure. In other examples the first protruding electrode may protrudes from a first side of the curved support structure and a second protruding electrode may also protrude from a first side of the curved support structure.

In some examples the first and second protruding electrodes may be provided in the same plane.

In some examples the overlaying electrode may be provided in a different plane to the first protruding electrode and second protruding electrode.

In some examples the first protruding electrode and the second protruding electrode may be suspended over the deformable substrate.

In some examples the overlaying electrode may be embedded in an overlaying elastomeric layer.

In some examples the overlaying electrode may be larger than the first protruding electrode and the second protruding electrode.

In some examples the overlaying electrode may be rigid.

In some examples the overlaying electrode may be deformable.

In some examples the deformable substrate may form a cavity in which the curved support structure and protruding electrode are provided.

In some examples a radius of curvature of the curved support structure may be parallel to a plane of the deformable substrate In some examples the curved support structure may have a serpentine shape. The serpentine shape may comprise a plurality of loops such that a loop which extends to a left hand side is followed by a loop which extends to a right hand side.

In some examples the deformable substrate may be configured to be deformed in response to a force applied by a user.

BRIEF DESCRIPTION

Figures 4A, 4B:
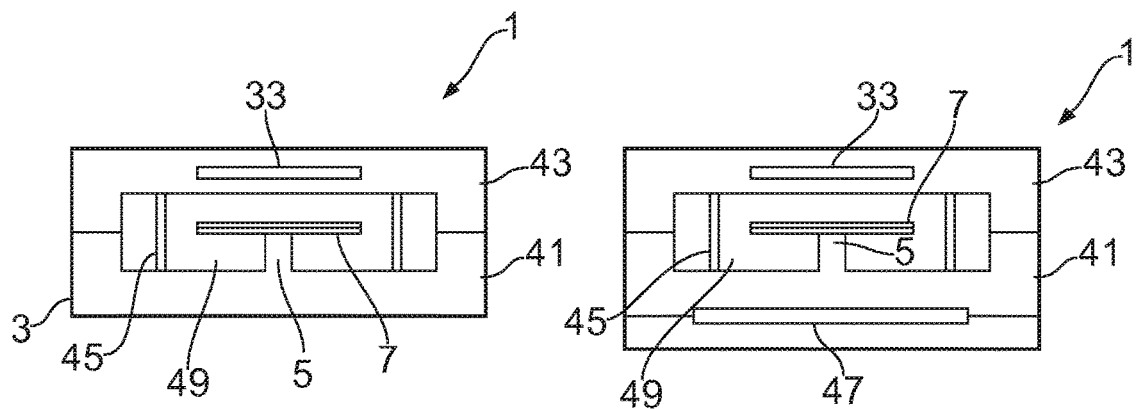
Figure 5:
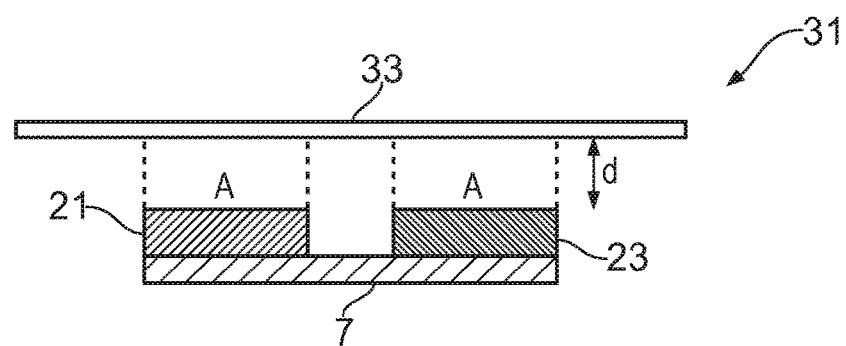
Figures 6A, 6B:
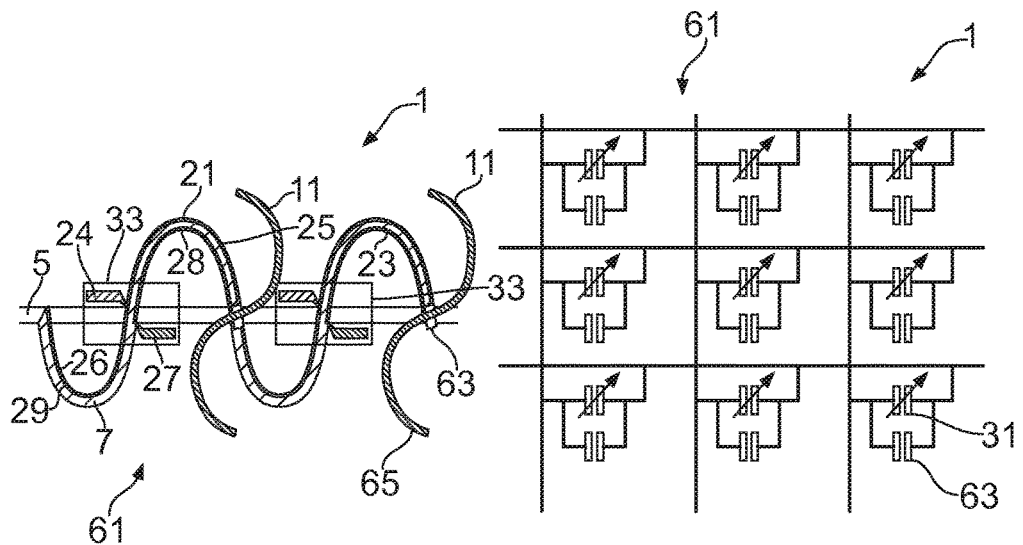
Figure 7A:
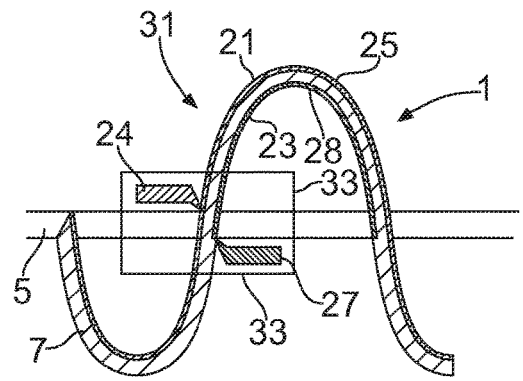
Figures 7B, 7C:
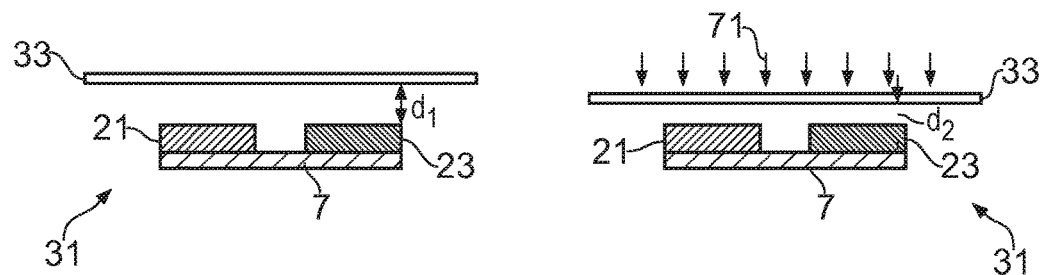
Figure 15:
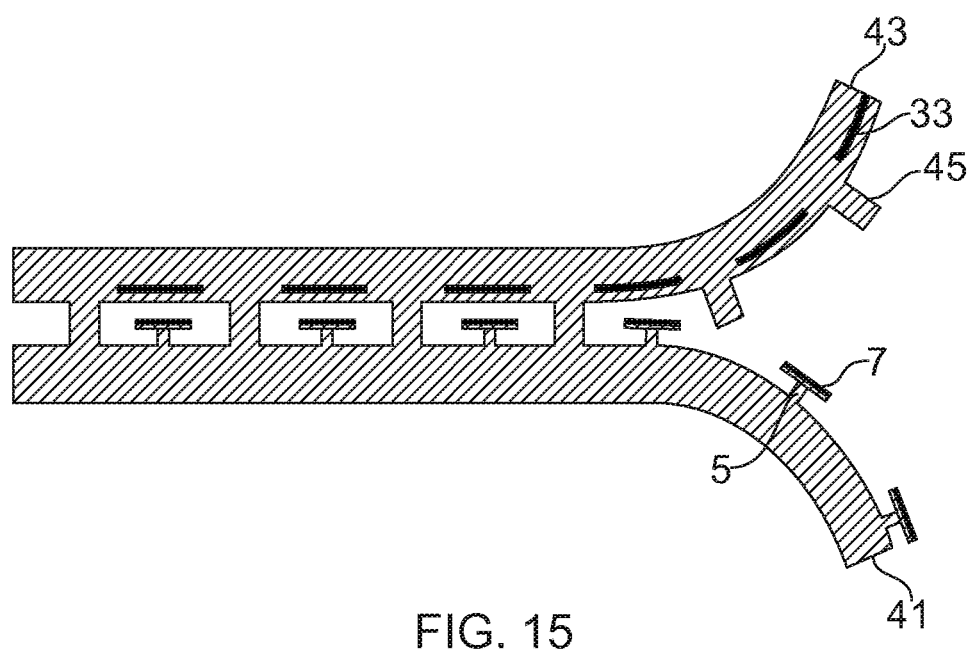
Figure 16A:
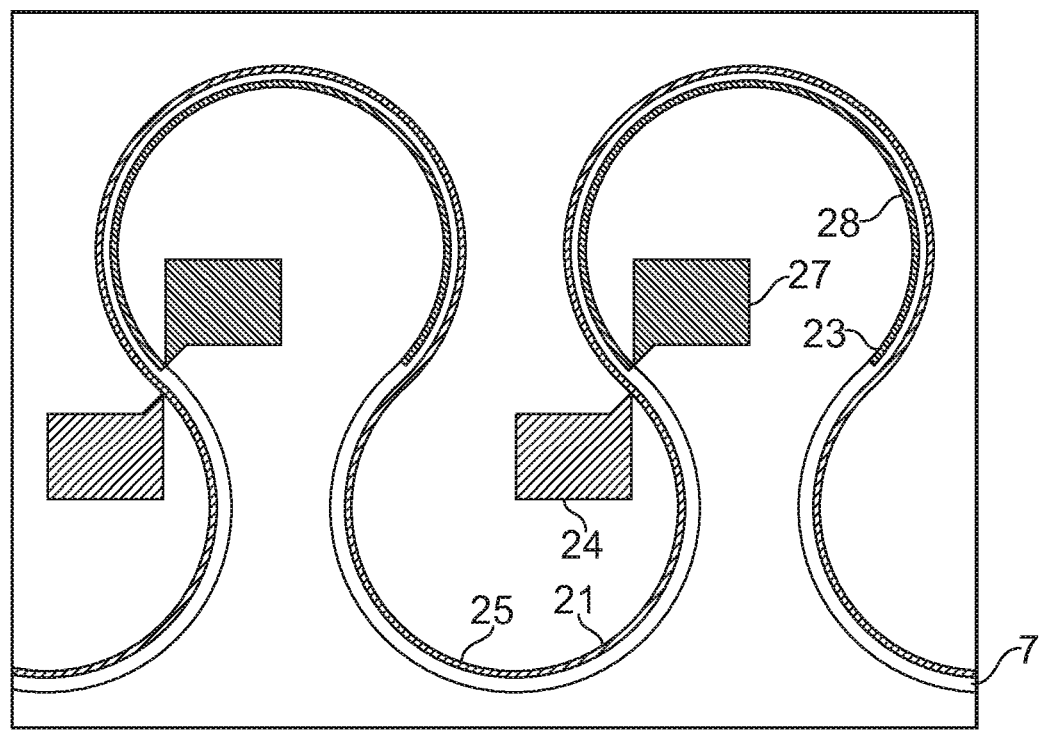
Figure 16B:
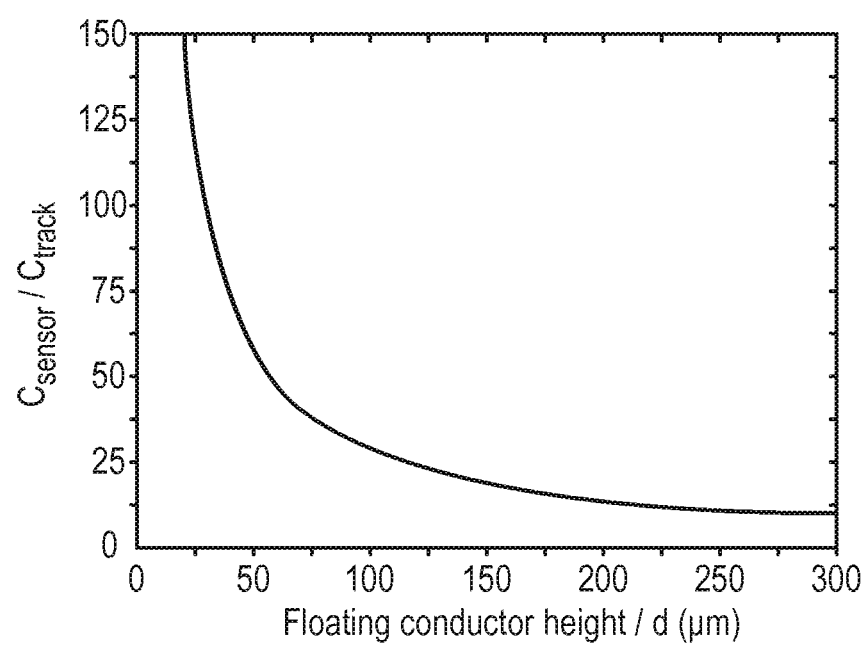

For a better understanding of various examples that are useful for understanding the detailed description, reference will now be made by way of example only to the accompanying drawings in which:

FIG. 1 illustrates an example apparatus;
FIGS. 2A and 2B illustrate an example apparatus;
FIG. 3 illustrates an example apparatus;
FIGS. 4A and 4B illustrate an example apparatus;
FIG. 5 schematically illustrates a capacitive sensor;
FIGS. 6A and 6B illustrate an example apparatus;
FIGS. 7A to 7C illustrate an example apparatus;
FIGS. 8A to 8D illustrate an example apparatus;
FIGS. 9A to 9E illustrate an example apparatus;
FIGS. 10A and 10B illustrate an example apparatus;
FIGS. 11A to 11D illustrate an example apparatus
FIG. 12 illustrates a method;
FIGS. 13A to 13O illustrate a method;
FIGS. 14A to 14F illustrate a method; and
FIG. 15 illustrates a method; and
FIGS. 16A and 16B illustrate the effect that parasitic capacitance may have within example apparatus.

DETAILED DESCRIPTION

The Figures illustrate an apparatus 1 comprising: a deformable substrate 3; a curved support structure 7; at least one support 5 configured to space the curved support structure 7 from the deformable substrate 3 so that when the deformable substrate 3 is deformed the curved support structure 7 is not deformed in the same way; and a capacitive sensor 31 comprising a protruding electrode 21, 23 capacitively coupled to an overlaying electrode 33; wherein the protruding electrode 21, 23 protrudes from a side of the curved support structure 7.

The apparatus 1 may be provided within a stretchable and/or deformable electronic device. The apparatus 1 may be for sensing deformation of the electronic device. The capacitive sensors 31 may be configured so that variation in the capacitance between the protruding electrode 21, 23 and the overlaying electrode 33 gives an indication of the deformation of the electronic device.

FIG. 1 schematically illustrates an apparatus 1 according to an example of the disclosure. The apparatus 1 illustrated in FIG. 1 comprises a deformable substrate 3, at least one support 5 and a curved support structure 7. Only features relevant to the following description have been illustrated in FIG. 1. It is to be appreciated that in other examples other features may be included. For example the apparatus 1 may be configured to be incorporated within a deformable electronic device such as a sensor device a medical or biological sensing device, a wearable electronic device, a mobile cellular telephone or any other suitable electronic device.

In the example illustrated in FIG. 1 the deformable substrate 3 comprises a planar surface 9. In the example of FIG. 1 the planar surface 9 is flat or substantially flat. In other examples the deformable substrate 3 may have a different shape. For example it may be curved and/or the surface 9 of the deformable substrate 3 need not be flat.

The equilibrium shape of the deformable substrate 3 may be the flat configuration illustrated in FIG. 1. The equilibrium shape is the position and shape which the deformable substrate 3 will adopt when no external force is applied by the user of the apparatus 1. In other examples the deformable substrate 3 may have a different equilibrium shape, for example, the equilibrium shape may comprise at least a part of the deformable substrate 3 being bent or curved. In some examples the deformable substrate 3 may comprise both flat and curved portions.

The deformable substrate 3 may comprise at least one user-deformable portion which may be configured to change shape in response to a physical force applied to the apparatus 1. The physical force may be applied by a user of the apparatus 1. The change in shape may comprise bending, folding, twisting, stretching, compression, shearing or any other suitable deformation of a portion of the deformable substrate 3. In some examples the deformable substrate 3 may be configured to automatically return to the equilibrium shape when the force applied to the apparatus 1 is removed.

In the example of FIG. 1 the deformable substrate 3 may be configured to be stretched in the directions indicated by the arrows 10, 12. The arrow 10 indicates the principle direction of stretch. In this example the principle direction of stretch is parallel or substantially parallel to the at least one support 5. The arrow 12 indicates a secondary direction of stretch. In this example the secondary stretch is perpendicular or substantially perpendicular to the at least one support 5.

In some examples the deformable substrate 3 may comprise a flexible substrate which may be bent or twisted by a user. The deformable substrate 3 may comprise a polymer material, elastomeric material or any other material which may be deformed in response to a force applied by the user of the apparatus 1.

In other examples the deformable substrate 3 may comprise a plurality of hinged or jointed segments. The hinged or jointed segments may be configured to be moved with respect to each other to enable a portion of the deformable substrate 3 to be folded or bent or stretched. The deformable substrate 3 may be folded or bent or stretched in response to a force applied by the user of the apparatus 1.

In some examples one or more electronic components may be mounted on the deformable substrate 3.

The apparatus 1 illustrated in FIG. 1 also comprises at least one support 5. The at least one support 5 may comprise any means which may be configured to support one or more curved support structures 7 in a position spaced from the deformable substrate 3. In the example of FIG. 1 the at least one support 5 comprises a beam 6 which extends in a direction perpendicular to the planar surface 9 of the deformable substrate 3.

In the example of FIG. 1 the at least one support 5 comprises a beam 6 which extends along a portion of the planar surface 9 of the deformable substrate 3. It is to be appreciated that other types of support may be used in other example apparatus 1. For example, the at least one support 5 may comprise a plurality of individual supports which are located separated from each other on the planar surface 9 of the deformable substrate 3. The plurality of individual supports may be any suitable size or shape for example, the individual supports may be square or rectangular or cylindrical or any other suitable shape. In some examples different individual supports may have different sizes and/or shapes.

In some examples the at least one support 5 may be configured to be deformable in response to a force applied by a user. For example the at least one support 5 may be configured to bend or stretch or be compressed or any other suitable deformation in response to a force applied to an electronic device by a user. In other examples the at least one support 5 may be configured so that it is not deformable in response to a force applied by a user. For example, the at least one support 5 may comprise a rigid material so that the at least one support 5 is not compressed when a force is applied to the electronic device by a user.

The at least one support 5 may be coupled to the deformable substrate 3 so that if the deformable substrate 3 is deformed this also causes movement of the at least one support 5 from its equilibrium position. For example, in the apparatus 1 illustrated in FIG. 1 the support 5 comprises a beam 6 which is mounted on the deformable substrate 3 so that it extends along a portion of the planar surface 9 of the deformable substrate 3. If the portion of the deformable substrate 3 on which the beam 6 is mounted is deformed then the beam 6 is also deformed. The deformable substrate 3 may be deformed by being stretched, twisted or bent for example so the beam 6 may also be stretched, twisted or bent. In such examples the beam 6 may comprise a flexible material such as polymeric material, elastomeric material or any other material which may be deformed in response to a force applied by the user of the apparatus 1 but which is rigid enough to support the curved support structure 7.

As mentioned above, in some examples the at least one support 5 may comprise a plurality of individual supports which are located separated from each other on the planar surface 9 of the deformable substrate 3 rather than a continuous beam. In such examples deforming a portion of the deformable substrate 3 will cause changing the positions or relative orientations of the respective supports 5 and need not cause a deformation of an individual support. In such examples the supports 5 may be made of any suitable material which may be configured to support the curved support structure 7.

The apparatus 1 illustrated in FIG. 1 also comprises a curved support structure 7. The curved support structure 7 may be configured to support one or more protruding electrodes 21, 23 which may form part of a capacitive sensor 31. Examples of protruding electrodes 21, 23 and capacitive sensors 31 which may be used in examples of the disclosure are described below with reference to FIGS. 2A to 10B.

The curved support structure 7 may comprise any suitable material. In some examples the curved support structure 7 may comprise a non-conductive material. For example, the curved support structure 7 may comprise a polymer or other suitable material. The protruding electrodes 21, 23 may comprise conductive material which may be deposited on the curved support structure 7.

The curved support structure 7 may be coupled to the deformable substrate 3 via the at least one support 5. The at least one support 5 is configured to separate the curved support structure 7 from the substrate so that the curved support structure 7 is, at least partially, isolated from the deformable substrate 3. The at least one support 5 is positioned between the curved support structure 7 and the deformable substrate 3. The at least one support 5 may maintain the curved support structure 7 in a position which is spaced from the deformable substrate 3 so that the curved support structure 7 and the deformable substrate 3 are separated from each other. The distance of the separation between the curved support structure 7 and the deformable substrate 3 may be dependent on the height of the at least one support 5. In the example of FIG. 1 the distance of the separation between the curved support structure 7 and the deformable substrate 3 is the same as the height of the beam 6.

In some examples the curved support structure 7 and the at least one support 5 may be configured so that the curved support structure 7 does not directly contact the deformable substrate 3. In some examples the curved support structure 7 and the at least one support 5 may be configured so that the curved support structure 7 does not directly contact the deformable substrate 3 when the apparatus 1 is in an equilibrium, non-deformed state. In some examples the curved support structure 7 and the at least one support 5 may be configured so that the curved support structure 7 does not directly contact the deformable substrate 3 when the apparatus 1 is in a deformed state.

In the example of FIG. 1 the curved support structure 7 comprises an elongate member 11 which is coupled to the at least one support 5 at a plurality of different points along the length of the elongate member 11.

The elongate member 11 is curved. The elongate member 11 may comprise a plurality of curves. The total length of the elongate member 11 is greater than the length of the deformable substrate 3 over which the elongate member 11 extends. The curved portion 16 of the elongate member 11 has an angle of curvature greater than 180 degrees so that the elongate member 11 doubles back on itself to form a loop 13. The loop 13 comprises an opening 14 so the loop 13 is not closed. In the example of FIG. 1 the elongate member 11 comprises a plurality of loops 13. The plurality of loops 13 form a serpentine shape in which a loop 13 which extends to the left hand side of the beam 6 is followed by a loop 13 which extends to the right hand side of the beam 6. The elongate member 11 is configured so that the curved support structure 7 is distributed on either side of the beam 6.

The curved support structure 7 may be coupled to the at least one support 5 at a plurality of different points along the length of the elongate member 11. In the example of FIG. 1 the curved support structure 7 is coupled to the beam 6 at two points in each loop 13.

It is to be appreciated that the shape of the curved support structure 7 illustrated in FIG. 1 is an example and other shapes could be used in other examples of the disclosure.

In the example of FIG. 1 only one curved support structure 7 is illustrated. In some examples the apparatus 1 may comprise a plurality of curved support structures 7. The curved support structures 7 may extend in the same direction along the deformable substrate 3.

In some examples additional curved structures may be provided overlaying the curved support structures 7. The additional curved structures may extend in a direction perpendicular or substantially perpendicular to the curved support structure 7. Examples of apparatus 1 comprising curved support structures 7 and additional curved structures are described below with reference to FIG. 6A.

FIGS. 2A and 2B illustrate an example apparatus 1 comprising a first protruding electrode 21 and a second protruding electrode 23. FIG. 2A illustrates a plan view of a portion of the apparatus 1 and FIG. 2B illustrates a cross section through a portion of the apparatus 1.

The apparatus 1 illustrated in FIGS. 2A and 2B comprises a curved support structure 7 and at least one support 5 which may be as described in relation to FIG. 1. The apparatus 1 may also comprise a deformable substrate 3 which is not illustrated in FIGS. 2A and 2B.

In the example of FIGS. 2A and 2B the apparatus 1 comprises a first protruding electrode 21 and a second protruding electrode 23. The protruding electrodes 21, 23 may be configured to form part of a capacitive sensor 31.

In the example of FIGS. 2A and 2B the first protruding electrode 21 protrudes from a first side of the curved support structure 7 and the second protruding electrode 23 protrudes from a second side of the curved support structure 7. The first protruding electrode 21 comprises a first portion 24 which protrudes out from a side of the curved support structure 7 and a second portion 25 which extends along a first edge 26 of the curved support structure 7. The second protruding electrode 23 also comprises a first portion 27 which protrudes out from a side of the curved support structure 7 and a second portion 28 which extends along a second edge 29 of the curved support structure 7.

In the illustrated example in FIG. 2A the protruding electrodes 21, 23 protrude from different sides of the curved support structure 7. In the example of FIG. 2A the first protruding electrode 21 protrudes from the curved support structure 7 on a first side of the at least one support 5 and the second protruding electrode 23 protrudes from the curved support structure 7 on an opposite side of the at least one support 5. It is to be appreciated that other arrangements of the protruding electrodes 21, 23 may be used in other examples of the disclosure.

In the example of FIG. 2A the first portions 24, 27 of the protruding electrodes 21, 23 are the same size and shape. In the example of FIG. 2A the first portions 24, 27 of the protruding electrodes 21, 23 are rectangular or substantially rectangular. It is to be appreciated that other shapes and/or sizes of the protruding electrodes 21, 23 may be used in other examples of the disclosure.

The curved support structure 7 may be made from any suitable material. In the example of FIGS. 2A and 2B the curved support structure 7 is formed from a non-conductive material such as a polymer. The first portions 24, 27 which protrude from the edge of the curved support structure 7 may be formed from the same material as the curved support structure 7. In some examples the first portions 24, 27 which protrude out from the edge of the curved support structure 7 may be formed in a single piece with the curved support structure 7. This may minimise the strain in the curved support structure 7.

The first portions 24, 27 may be isolated from the deformable substrate 3 and the at least one support 5 because they are connected to the curved support structure 7 and not directly connected to either the deformable substrate 3 or the at least one support 5. The first portions 24, 27 of the protruding electrodes 21, 23 may be arranged so that they are suspended over the deformable substrate 3.

The protruding electrodes 21, 23 may be fabricated by depositing a conductive material on the surface of the curved support structure 7. The protruding electrodes 21, 23 may be fabricated using any suitable conductive material. The conductive material may also be deposited on the surface of the first portions 24, 27 which protrude from the side of the curved support structure 7. The conductive material may be deposited on the surface of the first portions 24, 27 which protrude from the side of the curved support structure 7 so that the surface of the first portions 24, 27 are completely covered by the conductive material.

FIG. 3 illustrates an example apparatus 1 comprising a capacitive sensor 31. The example apparatus 1 comprises a curved support structure 7, at least one support 5 and protruding electrodes 21, 23 which may be as described in relation to FIGS. 1 and 2A to 2B. The apparatus 1 may also comprise a deformable substrate 3 which is not illustrated in FIG. 3.

In the example of FIG. 3 the capacitive sensor 31 comprises a first protruding electrode 21 and second protruding electrode 23 and an overlaying electrode 33. The overlaying electrode 33 may comprise any conductive material. The overlaying electrode 33 may be capacitively coupled to the protruding electrodes 21, 23. The overlaying electrode 33 and the protruding electrodes 21, 23 may be arranged so that a variation in the capacitance of the sensor 31 provides an indication of the deformation of the apparatus 1.

The overlaying electrode 33 may be provided in a different plane to the first protruding electrode 21 and second protruding electrode 23. The first protruding electrode 21 and second protruding electrode 23 may be provided in the same plane as each other.

The overlaying electrode 33 may have a larger surface area than the first portions 24, 27 of the protruding electrodes 21, 23. The overlaying electrode 33 may have a larger surface area than the combine surface area of the first portions 24, 27 of the protruding electrodes 21, 23. The overlaying electrode 33 may be arranged so that the surface area of the overlaying electrode 33 overlaps with the surface areas of the first portions 24, 27 of the protruding electrodes 21, 23. In the example of FIG. 3 the surface area of the overlaying electrode 33 is arranged so that it completely overlaps the surface areas of the first portions 24, 27 of the protruding electrodes 21, 23. In some examples the overlaying electrode 33 may be arranged so that it partially overlaps the surface areas of the first portions 24, 27 of the protruding electrodes 21, 23.

The overlaying electrode 33 may be separate from the first protruding electrode 21 and second protruding electrode 23. The overlaying electrode 33 may be separate from the first protruding electrode 21 and second protruding electrode 23 in that no direct current path is provided between the overlaying electrode 33 and the first protruding electrode 21 and/or second protruding electrode 23.

The overlaying electrode 33 may be supported using any suitable means. In some examples the overlaying electrode 33 may be embedded in a top portion of a deformable substrate 3.

In some examples the overlaying electrode 33 may be rigid. The rigid overlaying electrode 33 may be configured so that it does not change shape and/or size when a user applies a force to the apparatus 1. In other examples the overlaying electrode 33 may be deformable. The deformable overlaying electrode 33 may be configured so that it may change shape and/or size when a user applies a force to the apparatus 1. Whether the overlaying electrode 33 is rigid or deformable may depend on the type of deformation of the apparatus 1 which is to be detected.

FIGS. 4A and 4B illustrate cross sections through an example apparatus 1. The apparatus 1 comprises a deformable substrate 3, at least one support 5 and a curved support structure 7 which may be as described in relation to FIGS. 1 to 3. The cross sections of FIGS. 4A and 4B may be taken perpendicular to the principle direction of strain as indicated in FIG. 1. The curved support structure 7 may comprise protruding electrodes 21, 23 which may form a capacitive sensor 31 with the overlaying electrode 33.

The deformable substrate 3 comprises a lower portion 41 and an upper portion 43. The lower portion 41 may be provided underneath the curved support structure 7 and the upper portion 43 may be provided above the curved support structure 7. The deformable substrate 3 forms a cavity 49 in which the curved support structure 7 and the protruding electrodes 21, 23 are provided.

In the examples of FIGS. 4A and 4B additional support pillars 45 are provided between the upper portion 43 of the deformable substrate 3 and the lower portion 41 of the deformable substrate 3. The additional support pillars 45 may be formed from the same material as the deformable substrate 3. The additional support pillars 45 may be configured to prevent the upper portion 43 of the deformable substrate 3 from coming into contact with the curved support portion 7 when the apparatus 1 is deformed.

In the examples of FIGS. 4A and 4B the overlaying electrode 33 may be provided in the upper portion 43 of the deformable substrate 3. In other examples of the disclosure other means may be used to support the overlaying electrode 33 above the protruding electrodes 21, 23.

In FIG. 4B a shield layer 47 is provided. The shield layer 47 may comprise any means which may be configured to protect the capacitive sensor 31 from stray electromagnetic fields. In the example of FIG. 4B the shield layer 47 comprises a stretchable conductor which is provided in the lower portion 41 of the deformable substrate 3.

FIG. 5 schematically illustrates a capacitive sensor 31 which may be used in examples of the disclosure.

The capacitive sensor 31 comprises a first protruding electrode 21 and a second protruding electrode 23. The protruding electrodes 21, 23 may be as described in relation to FIGS. 1 to 4B and/or FIGS. 6A to 10B. The protruding electrodes 21, 23 are provided in the same plane. The overlaying electrode 33 is provided in a different plane to the protruding electrodes 21, 23. The overlaying electrode 33 may be provided above the protruding electrodes 21, 23.

The capacitive sensor 31 which is formed is equivalent to a parallel plate capacitor. The capacitance of the capacitive sensor 31 is determined by the interfacial area A and the separation d of the electrodes 33, 21, 23.

The interfacial area A may be the surface area of the protruding electrodes 21, 23 which overlaps with the surface area of the overlaying electrode 33. The protruding electrodes 21, 23 comprise first portions 24, 27 which protrude from the side of the curved conductive structure 7 and second portions 25, 28 which extend along edges 26, 29 of the curved support structure 7. As the surface area of the first portions 24, 27 is significantly larger than the surface area of the second portions 25, 28, the area A may be approximated as the area of the first portions 24, 27 which overlaps with the overlaying electrode 33.

The separation d of the electrodes 33, 21, 23 may be the distance between the overlaying electrode 33 and the protruding electrodes 21, 23. As the protruding electrodes 21, 23 are provided in the same plane the separation d is the same for both protruding electrodes 21, 23.

The capacitance of the capacitive sensor 31 is approximated by:

$$C = \frac{\varepsilon_r \varepsilon_0 2A}{2d}$$

Where C is the capacitance, A is the interfacial area, d is the separation between electrodes, $\varepsilon_r$ is the relative permittivity of the material between the electrodes 21, 23, 33 and $\varepsilon_0$ is the dielectric constant ($\approx 48.854 \times 10^{-12}$ Fm$^{-1}$).

When the apparatus 1 is deformed this may cause movement or deformation of the overlaying electrode 33 relative to the protruding electrodes 21, 23. For example applying strain or shear to an apparatus 1 may change the interfacial area A. Applying external pressure or compressing the apparatus 1 may reduce the separation d. These deformations will produce a change in the capacitance C of the capacitive sensor 31. The change in the capacitance C will be proportional to the movement or deformation according to the equation above. Therefore monitoring the capacitance of the capacitive sensor 31 will give an indication of the deformation of the apparatus 1.

The capacitance C of the capacitive sensor 31 may be monitored by connecting the two protruding electrodes 21, 23 to a measurement circuit.

In some examples the cavity 49 within the deformable substrate 3 may be filled with air. In other examples the cavity 49 may be filled with a fluid which has a higher dielectric constant than air so as to increase the capacitance of the capacitive sensor 31.

In some examples the apparatus 1 may comprise a plurality of different capacitive sensors 31. Different capacitive sensors 31 may be arranged to monitor different types of deformations. For example some of the capacitive sensors 31 may be arranged to monitor compression while others may be arranged to monitor shear and/or strain. The positions of the protruding electrodes 21, 23 and the overlaying electrodes 33 may be arranged to enable deformations such as shear and stress to be monitored along different axis of the apparatus 1.

FIGS. 6A and 6B illustrate an example of an apparatus 1 comprising an array 61 of capacitive sensors 31. The array 61 of capacitive sensors 31 may comprise a plurality of capacitive sensors 31. In some examples different capacitive sensors 31 within the array 61 may be configured to monitor different deformations. For example some capacitive sensors 31 may be arranged to detect compression of the apparatus 1, some capacitive sensors 31 may be arranged to detect strain of the apparatus 1 and some capacitive sensors 31 may be arranged to detect shear of the apparatus 1.

FIG. 6A illustrates a plan of a section of the apparatus 1. FIG. 6B provides an equivalent circuit diagram for a three by three array 61 of capacitive sensors 31. It is to be appreciated that the array 61 of capacitive sensors 31 may comprise any number of capacitive sensors 31 in any suitable arrangement.

The apparatus 1 of FIGS. 6A and 6B comprises a deformable substrate 3, at least one support 5 and a curved support structure 7 which may be as described in relation to FIG. 1. Only one curved support structure 7 is illustrated in FIG. 6A however it is to be appreciated that the apparatus 1 may comprise a plurality of curved support structures 7. The plurality of curved support structures 7 may extend in the same direction.

The curved support structures 7 may comprise a plurality of protruding electrodes 21, 23. The protruding electrodes 21, 23 comprise first portions 24, 27 and second portions 25, 28 as described above. In the example of FIG. 7A the second portions 25 of the first protruding electrodes 21 are provided continuously along the first edge of the curved support structure 7 so that there are no gaps between the second portions 25 of the first protruding electrodes 21. The second portions 28 of the second protruding electrodes 23 are provided in sections along the second edge 29 of the curved support structure 7 so that there are insulating gaps between adjacent second protruding electrodes 23.

In the example of FIGS. 6A and 6B the apparatus 1 also comprises a plurality of additional curved structures 65. The additional curved structures 65 may comprise an elongate member 11. The elongate member 11 may form a serpentine shape. The serpentine shape may be the same or similar to the serpentine shape of the curved support structure 7.

The additional curved structures 65 extend in a direction perpendicular to the curved support structures 7. The additional curved structures 65 are provided spaced along the length of the curved support structures 7 so that there are a plurality of intersecting points where an additional curved structure 65 crosses over a curved support structure 7.

The additional curved structures 65 are provided overlaying the curved support structures 7. The additional curved structures 65 may comprise an electrical connection to the second protruding electrode 23. The additional curved structures 65 provide cross connectors for the array 61 of capacitive sensors 31.

A dielectric insulating material 63 is provided between the first protruding electrode 21 and the additional support structure 65. The dielectric insulating material 63 may be configured to prevent a direct connection between the first protruding electrode 21 and the cross connector.

The information obtained by the array 61 of capacitive sensors 31 may be read using any suitable means. In the examples of FIGS. 6A and 6B each of the capacitive sensors 31 within the array 61 may be read independently by multiplexing read electronics.

As mentioned above, different arrangements of electrodes 21, 23, 33 may be used to measure different deformations of the apparatus 1. FIGS. 7A to 7C illustrate an example arrangement which may be used to monitor compression of an apparatus 1. FIGS. 8A to 8D illustrate an example arrangement which may be used to monitor strain of an apparatus 1. FIGS. 9A to 9E illustrate an example arrangement which may be used to monitor shear of an apparatus 1. FIGS. 10A and 10B illustrate an example arrangement which may be used to monitor strain of an apparatus 1 along different axis. FIGS. 11A to 11D illustrate example arrangements for a capacitive sensor 31.

FIGS. 7A to 7C illustrate an example apparatus 1 where a pressure capacitive sensor 31 is arranged to monitor compression of the apparatus 1. FIG. 7A illustrates a plan view of an example arrangement for a pressure capacitive sensor 31. FIG. 7B schematically illustrates the pressure capacitive sensor 31 before the apparatus 1 is compressed and FIG. 7C schematically illustrates the pressure capacitive sensor 31 after the apparatus 1 is compressed by pressure 71 applied to the apparatus 1. The apparatus 1 comprises a deformable substrate 3, at least one support 5, a curved support structure 7 protruding electrodes 21, 23 and an overlaying electrode 33 which may be as described above.

In the arrangement for monitoring compression the overlaying electrode 33 has a larger surface area than the first portions 24, 27 of the protruding electrodes 21, 23. The surface area of the overlaying electrode 33 completely covers the areas covered by the first portions 24, 27 of the protruding electrodes 21, 23. This may eliminate changes the capacitance C of the pressure capacitive sensor 31 which may be caused due to shear and/or strain of the apparatus 1.

In some examples the overlaying electrode 33 may be deformable. The overlaying electrode 33 may be deformable so that the overlaying electrode 33 may change shape when a force is applied to the apparatus 1. In such examples the overlaying electrode 33 may comprise silver nanowires, embedded metallic nanoparticles, thin gold film or any other deformable conductive material.

In other examples the overlaying electrode 33 may be rigid. The overlaying electrode 33 may be rigid so that the overlaying electrode 33 does not change shape when a force is applied to the apparatus 1. In such examples the overlaying electrode 33 may comprise copper foil or any other suitable rigid conductive material.

When pressure 71 is applied to the apparatus 1 the apparatus 1 is compressed. This decreases the separation d of the electrodes 21, 23, 33. The decrease in the separation d increases the capacitance C of the pressure capacitive sensor 31.

In the examples of FIGS. 7A to 7C the capacitance C of the pressure capacitive sensor 31 is given by:

$$C_{p1} = \frac{\varepsilon_r \varepsilon_0 2 A_{p1}}{2 d_1}$$

$$C_{p2} = \frac{\varepsilon_r \varepsilon_0 2 A_{p1}}{2 d_2}$$

where $C_{p1}$ is the initial capacitance of the pressure capacitive sensor 31, $C_{p2}$ is the capacitance of the pressure capacitive sensor 31 after the application of pressure and strain to the apparatus 1, $A_{p1}$ is the interfacial area between one protruding electrode 21, 23 and the overlaying electrode 33, $d_1$ is distance between the overlaying electrode 33 and the protruding electrodes 21, 23 before the application of pressure and strain to the apparatus 1 and $d_2$ is the distance between the overlaying electrode 33 and the protruding electrodes 21, 23 after the application of pressure and strain to the apparatus 1.

The interfacial area $A_{p1}$ may be constant before and after the application of pressure and strain to the apparatus 1. This may require the surface areas of the first portions 24, 27 of the protruding electrodes 21, 23 to remain constant before and after the application of pressure 71 to the apparatus 1. This may be achieved by using a rigid material to form the first portions 24, 27 of the protruding electrodes 21, 23. In some examples it may be achieved by mounting the first portions 24, 27 of the protruding electrodes 21, 23 on the curved support structure 7 so that they are not deformed when the deformable substrate 3 is deformed.

The value of $d_2$ can be measured using the ratio of the two pressure sensor capacitances:

$$\frac{C_{p1}}{C_{p2}} = \frac{d_2}{d_1}$$

Then:

$$d_2 = d_1 \frac{C_{p1}}{C_{p2}}$$

By measuring $d_2$ a measurement of the pressure 71 applied to the apparatus 1 may be obtained.

Figure 8A:
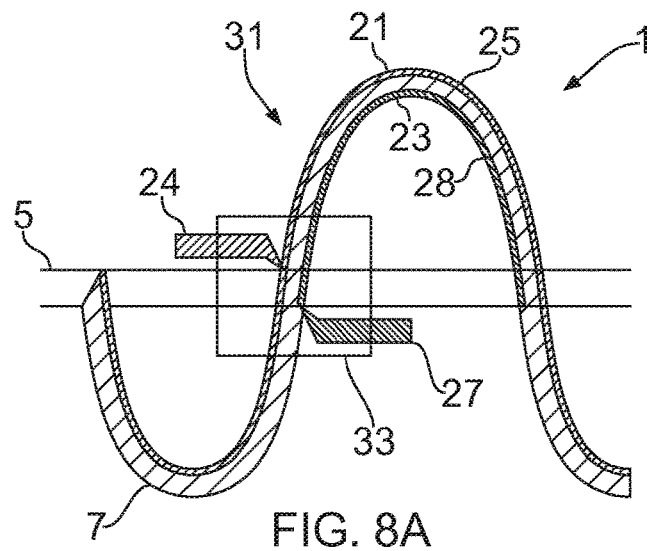
Figure 8B:
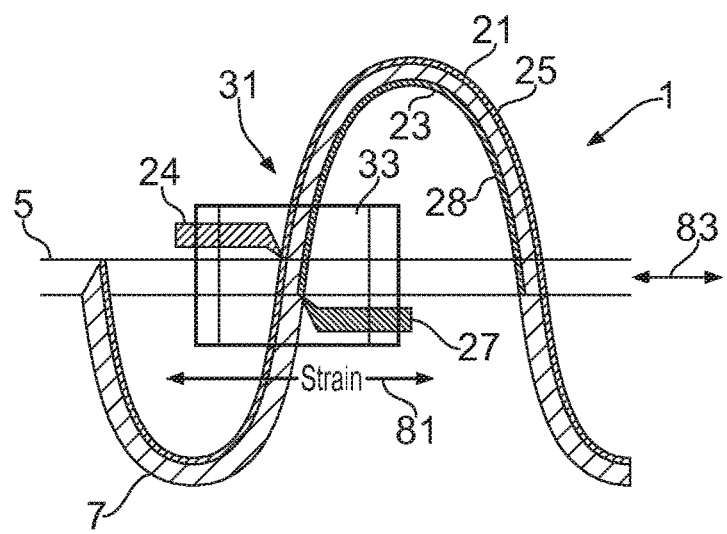
Figure 8C:
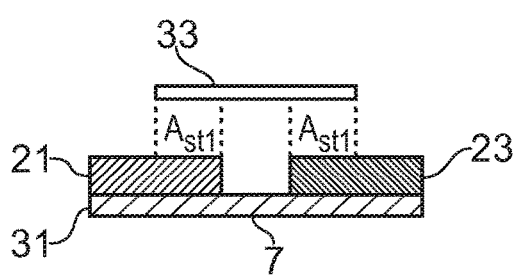
Figure 8D:
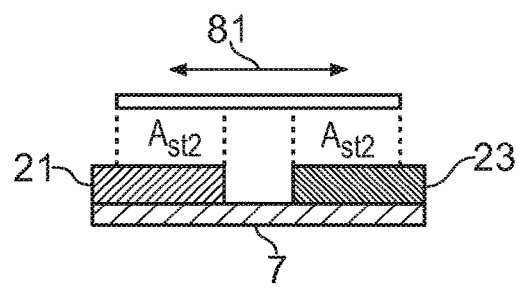

FIGS. 8A to 8D illustrate an example apparatus 1 where the capacitive sensor 31 is arranged to monitor strain of the apparatus 1. FIG. 8A illustrates a plan view of an example arrangement for a strain capacitive sensor 31. FIG. 8B illustrates a plan view of an example arrangement for a strain capacitive sensor 31 after strain 81 has been applied to the apparatus 1. FIG. 8C schematically illustrates the strain capacitive sensor 31 before the strain 81 is applied to the apparatus 1. FIG. 8D schematically illustrates the strain capacitive sensor 31 after the strain 81 is applied to the apparatus 1. The apparatus 1 comprises a deformable substrate 3, at least one support 5, a curved support structure 7 protruding electrodes 21, 23 and an overlaying electrode 33 which may be as described above.

In the arrangement for monitoring strain the overlaying electrode 33 has a larger surface area than the first portions 24, 27 of the protruding electrodes 21, 23. The surface area of the overlaying electrode 33 only partially covers the areas covered by the first portions 24, 27 of the protruding electrodes 21, 23. The surface area of the overlaying electrode 33 covers only a part of each of the first portions 24, 27 of the protruding electrodes 21, 23. The size of the parts of each of the first portions 24, 27 of the protruding electrodes 21, 23 which are covered by the overlaying electrode 33 may changes as a strain 81 is applied to the apparatus 1. This may enable changes in the capacitance C caused by the applied strain 81 to be measured.

In the arrangement for monitoring strain the overlaying electrode 33 may be deformable. The overlaying electrode 33 may be deformable so that the overlaying electrode 33 may change shape when a force is applied to the apparatus 1. In such examples the overlaying electrode 33 may comprise silver nanowires, embedded metallic nanoparticles, thin gold film or any other deformable conductive material.

FIGS. 8B and 8D show that when a positive strain 81 is applied to the apparatus 1 this stretches the overlaying electrode 33 and increases the interfacial area A for the capacitive sensor 31. It is to be appreciated that if a negative strain is applied to the apparatus 1 this may compress the overlaying electrode 33 and may decrease the interfacial area A for the capacitive sensor 31.

In the examples of FIGS. 8A to 8D the strain is applied along the direction of the at least one support 5. In other examples the strain 81 may be applied in other directions. The apparatus 1 may comprise other capacitive sensors 31 with electrodes 21, 23, 33 arranged to enable strain 81 applied in other directions to be measured.

In the example of FIGS. 8A to 8D shear of the overlaying electrode 33 will not change the interfacial area A for the capacitive sensor 31 and will not affect the measurements obtained by the capacitive sensor 31. However when the strain 81 is applied to the apparatus 1 there may also be compression of the apparatus 1. The compression may be caused by the application of pressure to the apparatus 1 and/or by the Poisson's ratio of the apparatus 1. This may need to be taken into account when measuring the change in capacitance.

In some examples the apparatus 1 may comprise means which may be configured to reduce the changes in the capacitance of the capacitive sensor 31 due to the compression. For example additional support pillars 45 may be provided to reduce the compression. The additional support pillars 45 may be made from a rigid material.

In other examples the apparatus 1 may comprise means for measuring the compression of the apparatus 1. For instance a pressure capacitive sensor 31 may be provided in close proximity to the strain capacitive sensor 31. The pressure and strain capacitive sensors 31 may be mechanically identical so that the ratio of their capacitances can be used to calculate the ratio of the interfacial length of the strain capacitive sensor 31 before and after application of strain and/or shear. The change in the interfacial length may then be used to determine the applied strain 81. An example of a method which uses a pressure capacitive sensor 31 provided in close proximity to the strain capacitive sensor 31 to determine the interfacial length and the applied strain 81 is given in the following paragraphs.

If the strain 81 is applied in the direction indicated in FIGS. 8B and 8D then the deformation of the apparatus 1 is symmetrical about the axis 83. In this example the axis 83 extends along the direction of the at least one support 5.

As the deformation of the apparatus 1 is symmetrical the deformation which is observed above by both protruding electrodes 21, 23 is the same. In the examples of FIGS. 8A to 8D the capacitance C of the pressure capacitive sensor 31 is given by:

$$C_{p1} = \frac{\varepsilon_r \varepsilon_0 2 A_{p1}}{2d_1}$$

$$C_{p2} = \frac{\varepsilon_r \varepsilon_0 2 A_{p1}}{2d_2}$$

For the pressure capacitive sensor 31 the separation d will change however the interfacial area A will not change.

The capacitance C of the strain capacitive sensor 31, which is in close proximity to the pressure capacitive sensor 31, is given by:

$$C_{st1} = \frac{\varepsilon_r \varepsilon_0 2 A_{st1}}{2d_1}$$

$$C_{st2} = \frac{\varepsilon_r \varepsilon_0 2 A_{st2}}{2d_2}$$

where $C_{st1}$ is the initial capacitance of the strain capacitive sensor 31 and $C_{st2}$ is the capacitance of the strain capacitive sensor 31 after the application of strain and/or pressure. For the strain capacitive sensor 31 the interfacial area A does change. For the strain capacitive sensor 31 the separation d also changes however the values $d_1$ and $d_2$ are the same as those for the pressure capacitive sensor 31.

The ratio of the initial capacitances of the strain capacitive sensor 31 and the pressure capacitive sensor 31 is:

$$\frac{C_{st1}}{C_{p1}} = \frac{A_{st1}}{A_{p1}}$$

The ratio of the capacitances of the two capacitive sensors 31 after application of pressure and strain is:

$$\frac{C_{st2}}{C_{p2}} = \frac{A_{st2}}{A_{p1}}$$

The ratio of these two terms gives:

$$\frac{C_{st2}/C_{p2}}{C_{st1}/C_{p1}} = \frac{A_{st2}/A_{p1}}{A_{st1}/A_{p1}} = \frac{A_{st2}}{A_{st1}}$$

If the width of the interfacial area A remains constant:

$$A_{st1} = w L_{st1}; A_{st2} = w L_{st2}$$

This gives:

$$\frac{C_{st2}/C_{p2}}{C_{st1}/C_{p1}} = \frac{wL_{st2}}{wL_{st1}} = \frac{L_{st2}}{L_{st1}}$$

The linear strain equation is given by:

$$\epsilon = \frac{L_2}{L_1} - 1$$

where $\epsilon$ is the linear strain. This then gives:

$$\epsilon = \frac{C_{st2}/C_{p2}}{C_{st1}/C_{p1}} - 1$$

This enables the linear strain $\epsilon$ to be calculated without needing to know the initial dimensions of any of the electrodes of either the pressure capacitive sensor 31 or the strain capacitive sensor 31. This may require that both the pressure capacitive sensor 31 and the strain capacitive sensor 31 are arranged within the apparatus 1 to undergo the same deformations.

Figure 9A:
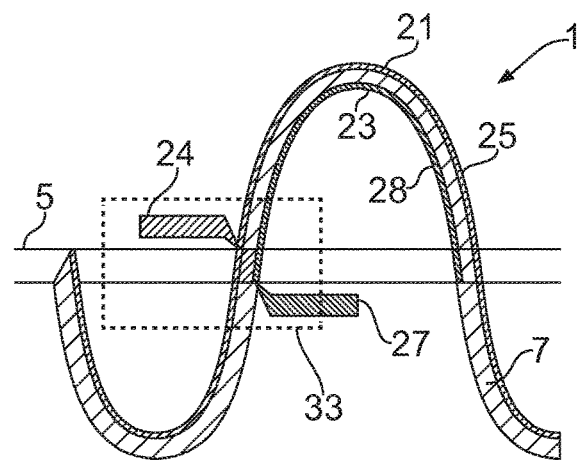
Figure 9B:
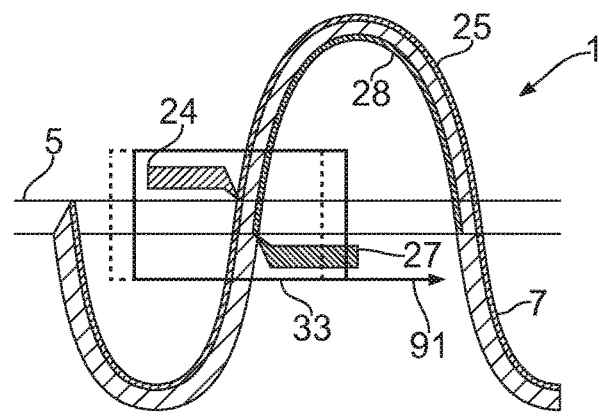
Figure 9C:
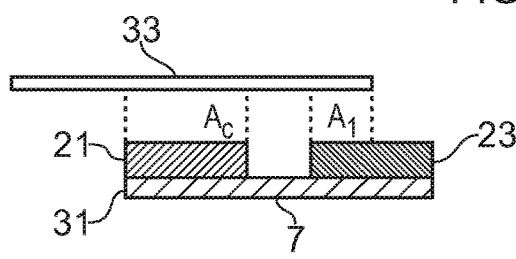
Figure 9D:
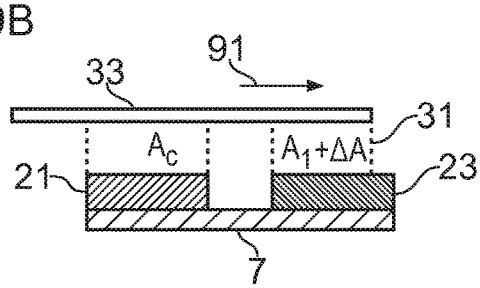
Figure 9E:
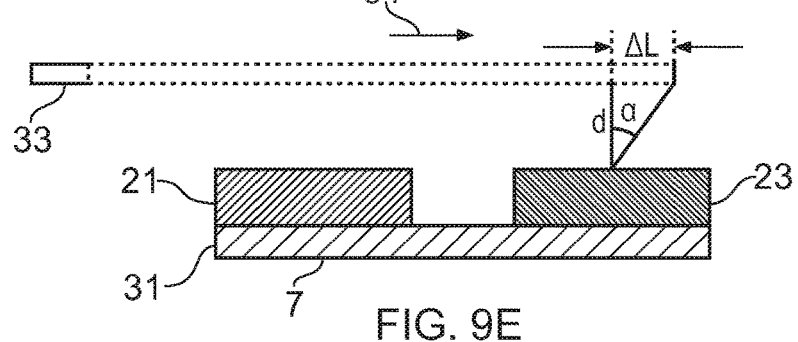
Figure 10A:
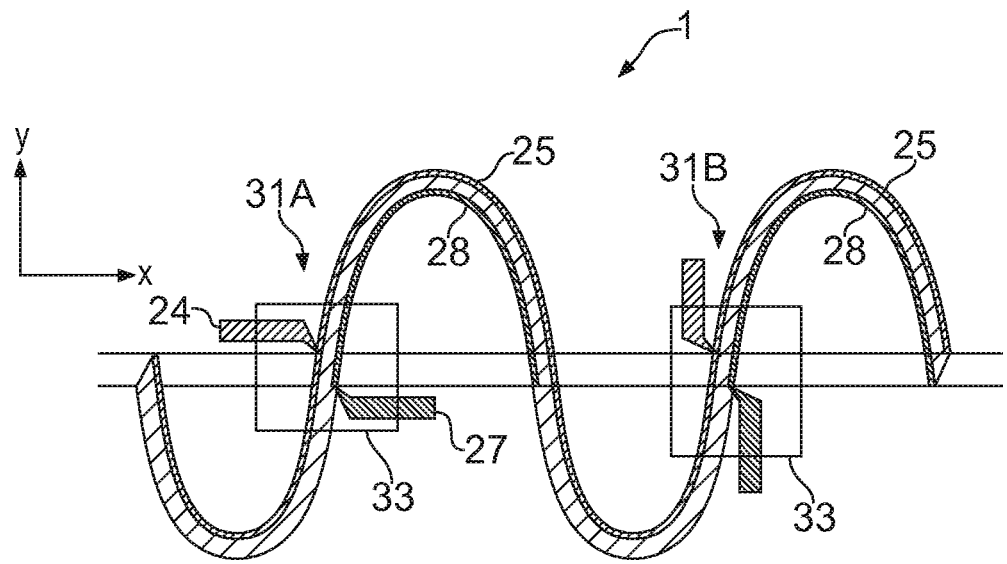
Figure 10B:
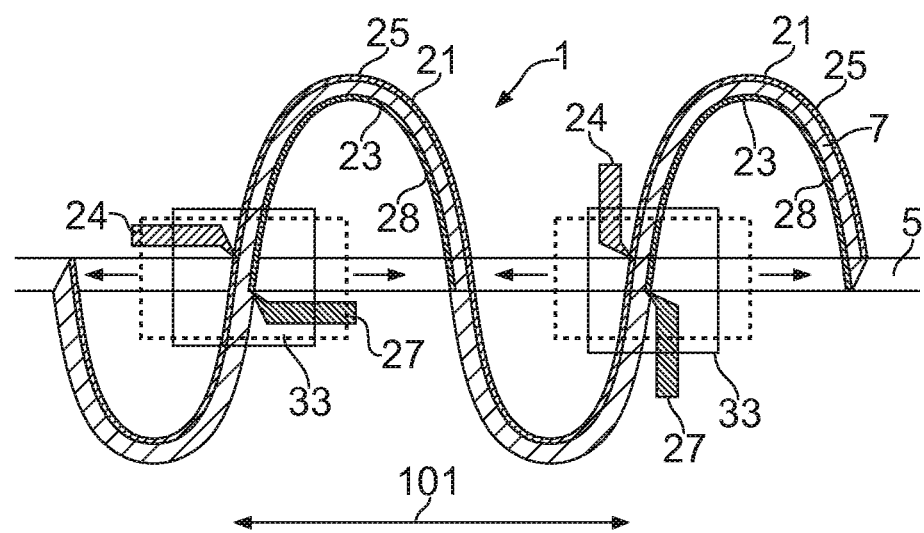

FIGS. 9A to 9E illustrate an example apparatus 1 where the capacitive sensor 31 is arranged to monitor shear 91 of the apparatus 1. FIG. 9A illustrates a plan view of an example arrangement for a shear capacitive sensor 31. FIG. 9B illustrates a plan view of an example arrangement for a shear capacitive sensor 31 after shear 91 has been applied to the apparatus 1. FIG. 9C schematically illustrates the shear capacitive sensor 31 before the shear 91 is applied to the apparatus 1. FIG. 9D schematically illustrates the shear capacitive sensor 31 after the shear 91 is applied to the apparatus 1. FIG. 9E illustrates the angle $\alpha$ of shear. The apparatus 1 comprises a deformable substrate 3, at least one support 5, a curved support structure 7 protruding electrodes 21, 23 and an overlaying electrode 33 which may be as described above.

In the arrangement for monitoring shear the overlaying electrode 33 has a larger surface area than the first portions 24, 27 of the protruding electrodes 21, 23. The surface area of the overlaying electrode 33 completely covers the surface area of the first portion 24 of the first protruding electrode 21 but only partially covers the surface area of the first portion 27 of the second protruding electrode 23. The size of the part of the first portion 27 of the second protruding electrode 23 which is covered by the overlaying electrode 33 may change as a shear 91 is applied to the apparatus 1. This may enable changes in the capacitance C caused by the applied shear 91 to be measured.

In the examples of FIGS. 9A to 9E the first portion 24 of the first protruding electrode 21 is completely covered by the overlaying electrode 33 but the first portion 24 of the second protruding electrode 23 is only partially covered by the overlaying electrode 33. It is to be appreciated that in other examples the apparatus 1 may be arranged so that the first portion 27 of the second protruding electrode 23 is completely covered by the overlaying electrode 33 but the first portion 24 of the first protruding electrode 21 is only partially covered by the overlaying electrode 33.

In the arrangement for monitoring shear the overlaying electrode 33 may be rigid. The overlaying electrode 33 maybe rigid so that the overlaying electrode 33 does not change shape when the shear 91 is applied to the apparatus 1. In such examples the overlaying electrode 33 may comprise a metal foil such as copper or any other suitable rigid conductive material. The use of a rigid material may eliminate changes capacitance caused by strain of the apparatus 1.

FIGS. 9C, 9D and 9E show that when a positive shear 91 is applied to the apparatus 1 in the direction indicated in FIGS. 9C, 9D and 9E this increases the interfacial area A between the second protruding electrode 23 and the overlaying electrode 33. The dashed lines indicate the position of the overlaying electrode 33 after the shear is applied. It is to be appreciated that if the shear 91 is applied in the opposite direction this would decrease the interfacial area A between the second protruding electrode 23 and the overlaying electrode 33. There is no change to the interfacial area A between the first protruding electrode 21 and the overlaying electrode 33.

When the shear 91 is applied to the apparatus 1 there may also be compression of the apparatus 1 which may reduce the separation d of the electrodes within the shear capacitive sensor 31.

In some examples the apparatus 1 may comprise means which may be configured to reduce the changes in the capacitance of the shear capacitive sensor 31 due to the compression. For example additional supports 45 may be provided to reduce the compression. The additional supports 45 may be configured to allow shear movements but reduce compression. For instance the additional supports 45 may comprise thick pillars with a mechanical break in the centre.

In other examples the apparatus 1 may comprise means for measuring the compression of the apparatus 1. For instance a pressure capacitive sensor 31 may be provided in close proximity to the shear capacitive sensor 31. The pressure and shear capacitive sensors 31 may be mechanically identical so that the ratio of their capacitances can be used to calculate the shear 91 as an angle $\alpha$. The angle $\alpha$ may be calculated from a change in interfacial length L and a change in separation d as illustrated in FIG. 9E. An example of a method which uses a pressure capacitive sensor 31 provided in close proximity to the shear capacitive sensor 31 to determine the angle $\alpha$ and the applied shear 91 is given in the following paragraphs.

The angle $\alpha$ of shear is given by:

$$\alpha = \tan^{-1}\frac{\Delta L}{d_2}$$

where $\Delta L$ is the change in the interfacial length when the shear 91 is applied. The change $\Delta L$ may be positive or negative depending on the direction that the shear 91 is applied in. $d_2$ is the separation between the protruding electrodes 21, 23 and the overlaying electrodes 33 after the shear 91 has been applied.

For the pressure capacitive sensor 31 the capacitance is given by:

$$C_{p1} = \frac{\varepsilon_r \varepsilon_0 2A_c}{2d_1}$$

$$C_{p2} = \frac{\varepsilon_r \varepsilon_0 2A_c}{2d_2}$$

where $C_{p1}$ is the capacitance before the shear 91 is applied and $C_{p2}$ is the capacitance after the shear 91 is applied.

For the shear capacitive sensor 31 the capacitance is given by:

$$C_{sh1} = \frac{\varepsilon_r \varepsilon_0 (A_c + A_1)}{2d_1}$$

$$C_{sh2} = \frac{\varepsilon_r \varepsilon_0 (A_c + A_1 + \Delta A)}{2d_2}$$

where $C_{sh1}$ is the capacitance before the shear 91 is applied and $C_{sh2}$ is the capacitance after the shear 91 is applied, $A_c$ is the interfacial area between the first protruding electrode 21 and the overlaying electrode 33, $A_1$ is the interfacial area between the second protruding electrode 23 and the overlaying electrode 33 and $\Delta A$ is the additional interfacial area produced when the shear 91 is applied.

The interfacial area $A_c$ between the first protruding electrode 21 and the overlaying electrode 33 may be constant so it does not change when the shear 91 is applied. The interfacial area between the second protruding electrode 23 and the overlaying electrode 33 is not constant and changes by $\Delta A$ when the shear 91 is applied. The change $\Delta A$ may be positive or negative depending on the direction in which the shear 91 is applied.

The additional interfacial area $\Delta A$ produced during the shear 91 is given by:

$$\Delta A = w \Delta L$$

The ratios of these capacitances gives:

$$\frac{C_{sh1}}{C_{p1}} = \frac{A_c + A_1}{2A_c}$$

$$\frac{C_{sh2}}{C_{p2}} = \frac{A_c + A_1 + \Delta A}{2A_c}$$

The ratios of these ratios give:

$$\frac{C_{sh2}/C_{p2}}{C_{sh1}/C_{p1}} =$$

$$\frac{A_c + A_1 + \Delta A}{A_c + A_1} = \frac{wL_c + wL_1 + w\Delta L}{wL_c + wL_1} = \frac{L_c + L_1 + \Delta L}{L_c + L_1} = \frac{\Delta L}{L_c + L_1} + 1$$

Where $L_c$ is the interfacial length between the first protruding electrode 21 and the overlaying electrode 33 and $L_1$ the interfacial length between the second protruding electrode 23 and the overlaying electrode 33 before the shear 91 is applied. The interfacial length $L_c$ between the first protruding electrode 21 and the overlaying electrode 33 remains constant but the interfacial length $L_1$ between the second protruding electrode 23 and the overlaying electrode 33 changes by $\Delta L$. w gives the width of the interfacial areas. The width w remains constant for both protruding electrodes 21, 23.

The ratios can be rearranged to give:

$$\Delta L = (L_c + L_1)\left(\frac{C_{sh2}/C_{p2}}{C_{sh1}/C_{p1}} - 1\right)$$

As in other examples the value of the separation $d_2$ can be measured using the ratio of the capacitance of the pressure capacitive sensor 31:

$$\frac{C_{p1}}{C_{p2}} = \frac{d_2}{d_1}$$

Then:

$$d_2 = d_1 \frac{C_{p1}}{C_{p2}}$$

The angle $\alpha$ of shear can then be calculated using:

$$\alpha = \tan^{-1} \frac{\Delta L}{d_2}$$

$$= \tan^{-1}\left(\frac{(L_c + L_1)\left(\frac{C_{sh2}/C_{p2}}{C_{sh1}/C_{p1}} - 1\right)}{d_1 \frac{C_{p1}}{C_{p2}}}\right)$$

$$= \tan^{-1}\left(\frac{(L_c + L_1)(C_{p1}C_{sh2} - C_{p2}C_{sh1})}{d_1 C_{p1} C_{sh1}}\right)$$

The parameter $L_1$, which represents the interfacial length between the second protruding electrode 23, may include some uncertainty due to misalignment of the protruding electrode 23 and overlaying electrode 33 during fabrication of the apparatus 1. If the interfacial length $L_c$ between the first protruding electrode 21 and the overlaying electrode 33, is known then $L_1$ may be calculated via the following:

$$\frac{C_{sh1}}{C_{p1}} = \frac{A_c + A_1}{2A_c} = \frac{wL_c + wL_1}{2wL_c} = \frac{L_c + L_1}{2L_c}$$

then:

$$(L_c + L_1) = 2L_c \frac{C_{sh1}}{C_{p1}}$$

Which simplifies the shear equation to:

$$\alpha = \tan^{-1}\left(\frac{2L_c(C_{p1}C_{sh2} - C_{p2}C_{sh1})}{d_1 C_{P1}^2}\right)$$

This enables the applied shear 91 to be calculated using the known interfacial length $L_c$ between the first protruding electrode 21 and the overlaying electrode 33, the separation d between the electrodes and the measured capacitances of the shear capacitive sensor 31 and the pressure capacitive sensor 31.

FIGS. 10A and 10B illustrate an example arrangement which may be used to monitor strain of an apparatus 1 along different axis. The example of FIG. 10A comprises two strain capacitive sensors 31. The strain capacitive sensors 31 may be as described above with regards to FIGS. 8A to 8D.

In the example of FIG. 10A the two strain capacitive sensors 31 are provided adjacent to each other on the same curved support structure 7. In other examples the two strain capacitive sensors 31 may be spaced from each other. For example they may be provided on different curved support structures 7 and/or there may be other capacitive sensors 31 provided between the two strain capacitive sensors 31.

In the example of FIG. 10A the two strain capacitive sensors 31A, 31B are configured to monitor strain in two different axes. In FIG. 10 the first axis is the x axis which extends parallel to the at least one support 5. The x axis is parallel with the principle direction of strain as illustrated in FIG. 1. The second axis is the y axis which extends perpendicular to the at least one support 5. The y axis is parallel with the secondary direction of strain as illustrated in FIG. 1.

The first capacitive sensor 31A is arranged to measure strain in the x axis. The first capacitive sensor 31A has the protruding electrodes 21, 23 aligned with an overlaying electrode 33 in the x direction. The protruding electrodes 21, 23 have rectangular first portions 21, 24 and are arranged so that the lengths of the rectangular portions extend in the x direction.

The second capacitive sensor 31B is arranged to measure strain in the y axis. The second capacitive sensor 31B has the protruding electrodes 21, 23 aligned with an overlaying electrode 33 in the y direction. The protruding electrodes 21, 23 have rectangular first portions 21, 24 and are arranged so that the lengths of the rectangular portions extend in the y direction.

FIG. 10B shows the change in shape of the overlaying electrode 33 when a strain 101 is applied in the x direction. This increases the length of the overlaying electrode 33 in the x direction but decreases the width of the overlaying electrode 33 in they direction. The ratio of the change in length and width will be determined by the Poisson's ratio of the overlaying electrode 33. The first capacitive sensor 31A is configured to detect the change in the x direction. In the example of FIG. 10B the first capacitive sensor 31A will detect an increase in capacitance. The second capacitive sensor 31B is configured to detect the change in the y direction. In the example of FIG. 10B the second capacitive sensor 31B will detect a decrease in capacitance.

It is to be appreciated that if the strain was applied in the y direction then this would decrease the length of the overlaying electrode 33 in the x direction but increase the width of the overlaying electrode 33 in they direction as determined by the Poisson's ratio. In such examples the first capacitive electrode 31A will detect a decrease in capacitance and the second capacitive electrode 31B would detect an increase capacitance.

If the strain is applied radially and/or in both the x and y directions then this would increase the length of the overlaying electrode 33 in both the x and y directions. In such examples both the first capacitive sensor 31A and the second capacitive sensor 31B would detect an increase capacitance.

This enables an apparatus 1 comprising two adjacent strain sensors 31A, 31B to be used to determine whether a strain is biaxial or uniaxial and also the direction in which the strain is applied.

It is to be appreciated that the example arrangements of FIGS. 10 and 10B may be applied to strain capacitive sensors 31 or shear capacitive sensors 31. This may enable strain and shear to be measured in a plurality of directions within a plane.

FIGS. 11A to 11D show alternative arrangements for the capacitive sensors 31 within the apparatus 1.

Figure 11A:
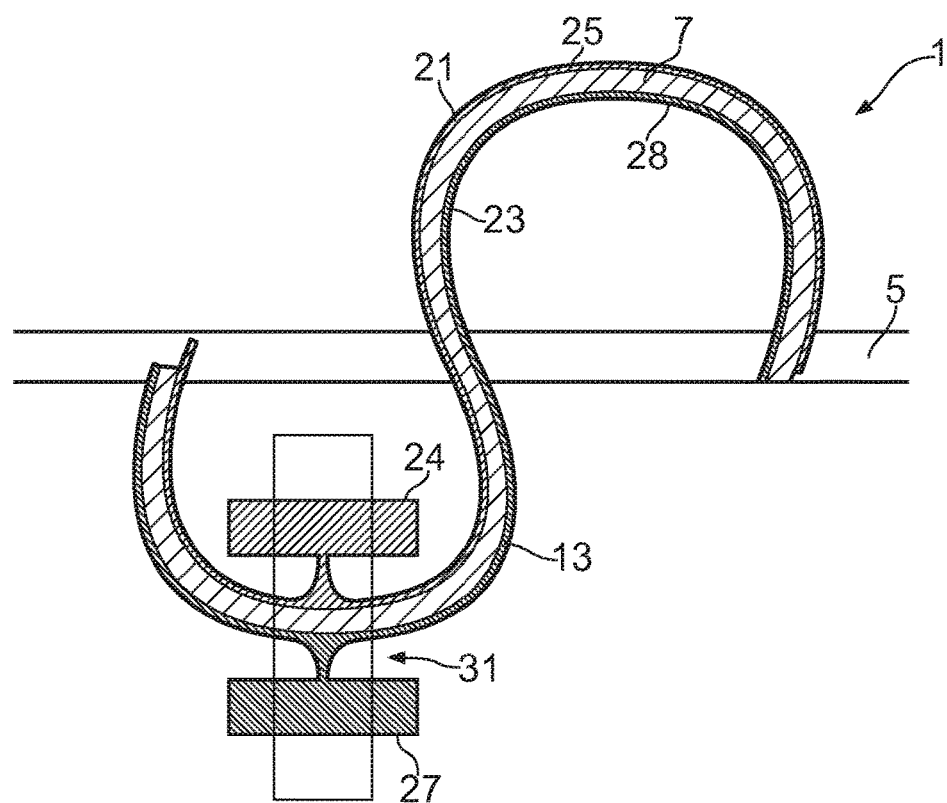
Figure 11B:
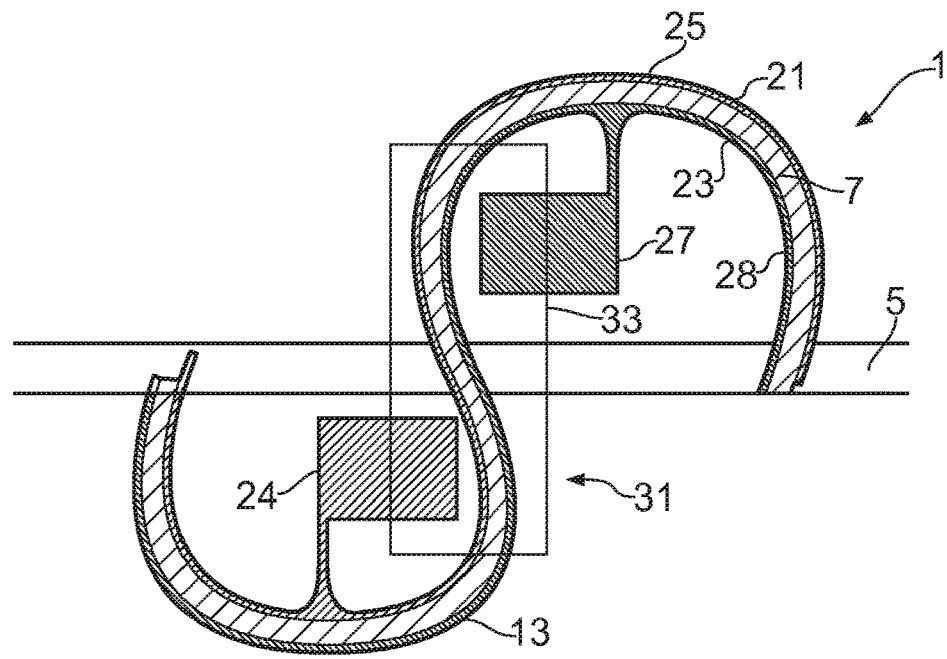
Figure 12:
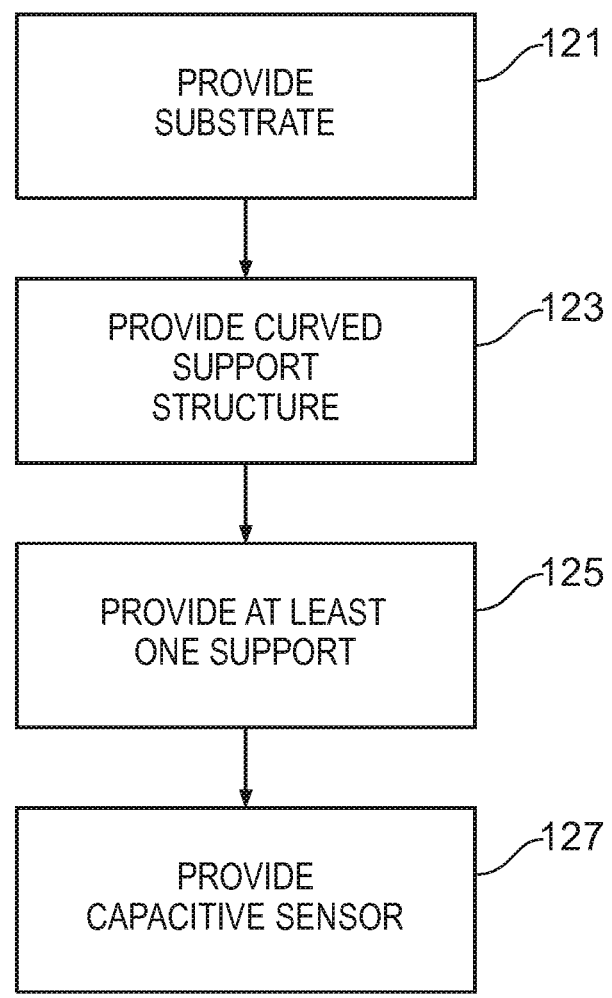

In the example arrangements of FIGS. 11A and 11B the first protruding electrode 21 protrudes from a first side of the curved support structure 7 and the second protruding electrode 23 protrudes from a second side of the curved support structure 7.

In the example of FIG. 11A the first portions 24, 27 of the protruding electrodes 21, 23 are provided on the apex of a loop 13 of the curved support structure 7. In the example of FIG. 11A the first portions 24, 27 of the protruding electrodes 21, 23 are provided on the apex of the same loop 13 of the curved support structure 7. The first portion 24 of the first electrode 21 is provided on the inside of the loop 13 while the first portion 27 of the second electrode 23 is provided on the outside of the loop 13.

The example arrangement of FIG. 11A may measure changes in capacitance caused by relative movement of the electrodes 21, 23, 33 as described above.

In the example of FIG. 11B the first portions 24, 27 of the protruding electrodes 21, 23 are provided on the apex of different loops 13 of the curved support structure 7. In the example of FIG. 11B the first portions 24, 27 of the protruding electrodes 21, 23 are provided on the apex of consecutive loops 13 of the curved support structure 7. The first portion 24 of the first electrode 21 is provided on the inside of a first loop 13 while the first portion 27 of the second electrode 23 is provided on the inside of an adjacent loop 13.

The example arrangements of FIG. 11B may reduce the effect of rotation of the first portions 24, 27 of the protruding electrodes 21, 23 when a strain is applied to the apparatus 1.

In the example arrangements of FIG. 11B the first portions 24, 27 of the protruding electrodes 21, 23 may move relative to each other when a strain is applied to the apparatus 1. However, if the strain is applied in the direction of the at least one support 5 each of first portions 24, 27 of the protruding electrodes 21, 23 will displaced by the same amount. If the strain is applied perpendicular to the at least one support 5 then there will be no displacement of the first portions 24, 27 of the protruding electrodes 21, 23 as the strain applied in that direction is decoupled from the curved support structure 7.

The example arrangement of FIG. 11B may enable alternative structures to be used within a strain capacitive sensor 31. In the example strain capacitive sensors 31 described above a deformable overlaying electrode 33 is used. If the arrangements of FIG. 11B is used then a rigid overlaying electrode 33 may be provided and the movement of the first portions 24, 27 of the protruding electrodes 21, 23 relative to the overlaying electrode 33 may be used to detect the applied strain.

Figure 11C:
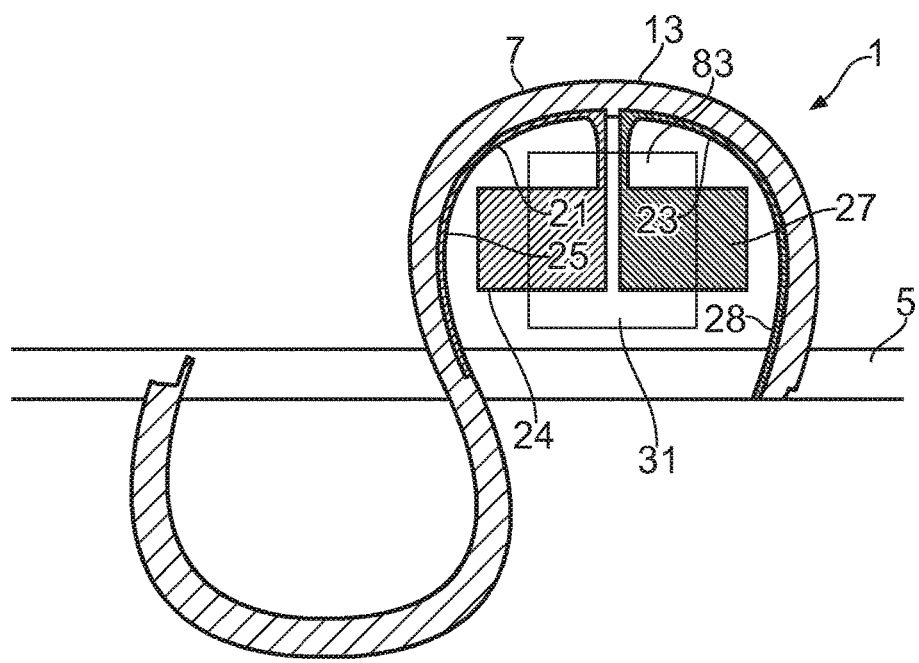
Figure 11D:
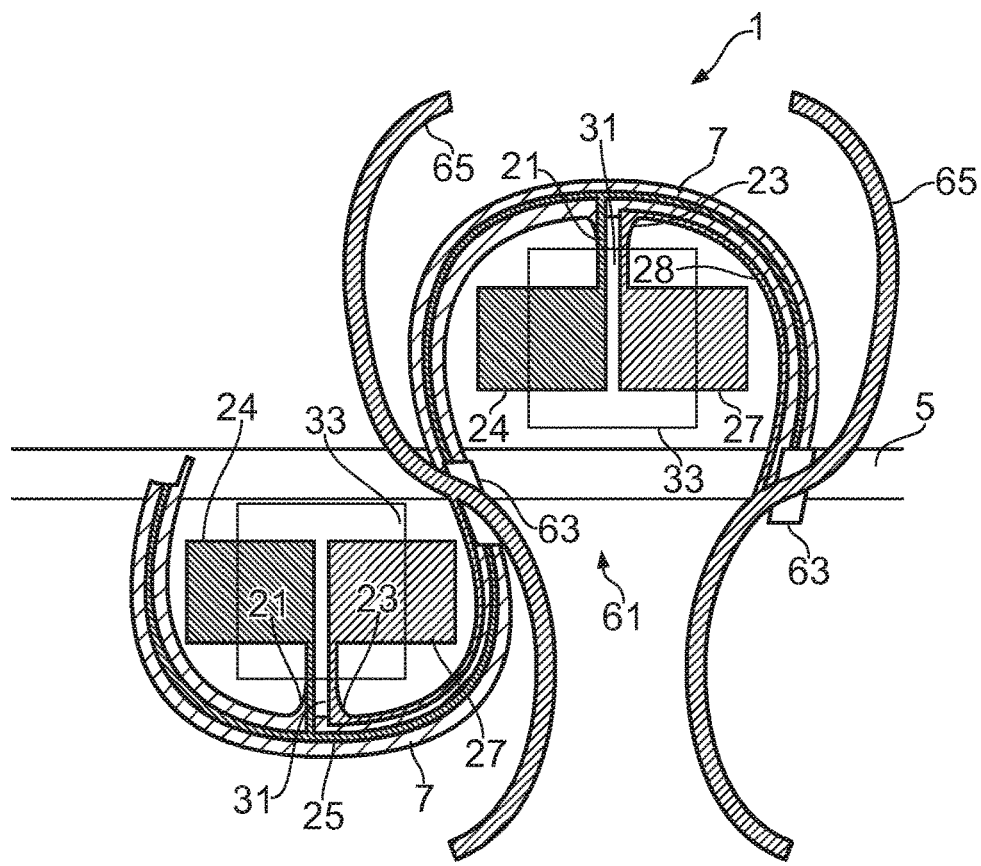

In the example arrangements of FIGS. 11C and 11D the first protruding electrode 21 protrudes from a first side of the curved support structure 7 and the second protruding electrode 23 also protrudes from the first side of the curved support structure 7.

In the example of FIG. 11A the first portions 24, 27 of the protruding electrodes 21, 23 are provided on the apex of a loop 13 of the curved support structure 7. In the example of FIG. 11C the first portions 24, 27 of the protruding electrodes 21, 23 are provided on the apex of the same loop 13 of the curved support structure 7. Both the first portion 24 of the first electrode 21 and the first portion 27 of the second electrode 23 are provided on the inside of the loop 13. Both the second portion 25 of the first electrode 21 and the second portion 28 of the second electrode 23 extend along the same edge of the curved support structure 7.

The overlaying electrode 33 is provided overlaying a portion of both of the first portions 24, 27 of the protruding electrodes 21, 23.

The example arrangement of FIG. 11C may measure changes in capacitance caused by relative movement of the electrodes 21, 23, 33 as described above.

FIG. 11D shows an example of how an arrangement with both the first portion 24 of the first electrode 21 and the first portion 27 of the second electrode 23 on the same side of the curved support structure 7 could be multiplexed. This may enable an array 61 of capacitive sensors 31 to be provided.

In the example of FIG. 11D the second portion 25 of the first protruding electrode 21 extends along the length of the curved support structure 7. In some examples the second portion 25 of the first protruding electrode 21 may extend along the centre of the curved support structure 7 as this may be the region of lowest strain. In other examples the second portion 25 of the first protruding electrode 21 may be provided in other positions on the curved support structure 7. For instance the second portion 25 of the first protruding electrode 21 may meander from one side of the curved support structure 7 to the other at adjacent apexes.

The second portion 28 of the second electrode 23 is provided in sections along the edge of the curved support structure 7.

The example apparatus 1 of FIG. 11D also comprises a plurality of additional curved structures 65. The additional curved structures 65 are provided overlaying the curved support structures 7. The additional curved structures 65 may comprise an electrical connection to the second protruding electrodes 23. The additional curved structures 65 provide cross connectors for the array 61 of capacitive sensors 31.

Portions of dielectric insulating material 63 are provided between the first protruding electrode 21 and the additional support structure 65. The dielectric insulating material 63 may be configured to prevent a direct connection between the first protruding electrode 21 and the cross connector.

The equivalent circuit diagram for the arrangement of FIG. 11D would be the same as that of FIG. 6B.

The example arrangements of FIGS. 11A to 11D may introduce additional weight at the apex of the loops 13 of the curved support structure 7. In some examples the additional weight could be reduced by perforating the first portions 24, 27 of the protruding electrodes 21, 23.

FIGS. 12 to 15 illustrate example methods which may be used to provide apparatus 1 according to examples of the disclosure. The apparatus 1 may be as described above with regards to FIGS. 1 to 11D.

FIG. 12 illustrates a method. The method comprises, at block 121 providing a deformable substrate 3. The method comprises, at block 123, providing a curved support structure 7 and, at block 125, providing at least one support 5 configured to space the curved support structure 7 from the deformable substrate 3 so that when the deformable substrate 3 is deformed the curved support structure 7 is not deformed in the same way. The method also comprises, at block 127, providing a capacitive sensor 31 comprising a protruding electrode 21, 23 capacitively coupled to an overlaying electrode 33.

The protruding electrode 33 protrudes from a side of the curved support structure 7.

FIGS. 13A to 13O illustrate a method also illustrate an example method of providing an apparatus 1. The example method of FIGS. 13A to 13O may be used to provide an apparatus 1 such as the apparatus 1 described above.

In FIG. 13A a release layer 131 is deposited on a silicon wafer 133. In FIG. 13B a photoresist layer 135 is deposited on the release layer 131. The photoresist layer 135 is patterned as a protruding electrode 23. In the example of FIG. 13B the electrode may be a second protruding electrode 23 and may comprise a portion which extends along a cross connecting additional curved structure 65 and a first portion 27 which will protrude for the side of a curved support structure 7.

In FIG. 13C a conductive material 137, such as metal, is deposited on the photoresist layer 135. The conductive material 137 may be deposited using any suitable means such as evaporation or sputtering. In FIG. 13D the photoresist layer 135 is removed and the second protruding electrode 23 is left on the release layer 131.

In FIG. 13E dielectric insulating material 63 is deposited on the cross connecting additional curved structure 65. The dielectric insulating material 63 may be deposited using any suitable means such as inkjet printing or screen printing. In FIG. 13F a second photoresist layer 139 is deposited on the release layer 131. The second photoresist layer 139 is patterned as another protruding electrode 21. In the example of FIG. 13F the electrode may be a first protruding electrode 21 and may comprise a portion which extends continuously along an edge of the curved support structure 7 and first portion 24 which will protrude for the side of a curved support structure 7.

In FIG. 13G a conductive material 141, such as metal, is deposited on the second photoresist layer 139. The conductive material 141 may be deposited using any suitable means such as evaporation or sputtering. In FIG. 13H the photoresist layer 139 is removed and the two protruding electrodes 21, 23 are left on the release layer 131.

In FIG. 13I a polymer 143 is deposited onto the protruding electrodes 21, 23. The polymer 143 may be a photopatternable polymer. The polymer 143 may be spin coated onto the protruding electrodes 21, 23. In other examples other means for depositing the polymer 143 may be used. In FIG. 13J a third photoresist layer 145 is deposited on the polymer 143. The third photoresist layer 145 is patterned as the curved support structure 7. The curved support structure may include the first portions 22, 27 for the protruding electrodes 21, 23. The third photoresist layer 145 may also be pattered to provide the additional curved structure 65.

In FIG. 13J the polymer 143 is also exposed to ultra-violet (UV) light 147. The UV light 147 hardens the polymer 143 which is exposed to the UV light by increasing the number of crosslinks in the polymer 143. The portions of the polymer 143 which are not exposed to UV light 147 remain as uncrosslinked polymer 143. In FIG. 13K the third photoresist layer 145 and the uncrosslinked polymer 143 are removed. This leaves the curved support structure 7 and additional curved support structure 65.

In FIG. 13L a fourth photoresist layer 149 is deposited. The fourth photoresist layer 149 is patterned as the at least one support 5. In the example of FIG. 13L the at least one support 5 comprises a beam 6. In FIG. 13M an elastomer layer 151 is cast against the fourth photoresist layer 149 and cured. In FIG. 13N the fourth photoresist layer 149 and the release layer 131 are removed leaving a deformable substrate 3, beam 6 and curved support structure 7 comprising protruding electrodes 21, 23. In FIG. 13O the structure is inverted to leave an apparatus 1 as described above.

The apparatus 1 produced using the method of FIGS. 13A to 13O have both the first protruding electrode 21 and the second protruding electrode 23 deposited on the same side of the curved support structure 7. In other examples the first protruding electrode 21 and the second protruding electrode 23 could be deposited on opposite surfaces of the curved support structure 7. Such example apparatus 1 would not need the dielectric insulating material 63 because the polymer of the curved support structure 7 would separate the two electrodes 21, 23.

The methods used to produce such alternative apparatus 1 could be similar to the methods of FIGS. 13A to 13O. However the block of FIG. 13E could be removed as the dielectric insulating material 63 is not needed. The methods of block 13F to 13H would be switched with the methods of block 131 to 13K so that the curved support structure 7 is fabricated between the two protruding electrodes 21, 23.

FIGS. 14A to 14F illustrate a method which may be used provide part of a deformable substrate 3. In the examples of FIGS. 14A to 14F the deformable substrate comprises an overlaying electrode 33.

In FIG. 14A a photoresist layer 161 is deposited onto a silicon substrate 163. The photoresist layer 161 may be spin coated onto the silicon substrate 163. Other means of depositing a photoresist layer 161 may be used in other examples of the disclosure.

In FIG. 14B the layer of photoresist 161 is patterned as additional support pillars 45. In FIG. 14C an elastomer layer 165 is cast against the photoresist layer 161 and cured. This elastomer layer 165 may form part of an upper portion 43 of a deformable substrate 3.

In. FIG. 14D an overlaying electrode 33 is fabricated on the elastomer layer 165. The overlaying electrode 33 may comprise a rigid conductive material or a flexible conductive material. The overlaying electrode 33 may be fabricated using any suitable means such as inkjet printing, screen printing, pick and place or any other suitable technique.

In FIG. 14E a further elastomer layer 167 is coated over the overlaying electrode 33. The further elastomer layer 167 may be coated using any suitable technique such as spin-coating or any other suitable technique.

In FIG. 14F the photoresist layer 161 is removed leaving an upper portion 43 of a deformable substrate 3 with additional support pillars 45 and an integrated overlaying electrode 33.

FIG. 15 illustrates an example method which may be used to combine the upper portion 43 of a deformable substrate 3 with the lower portion 41 of the deformable substrate 3. The upper portion 43 of the deformable substrate 3 may be formed as described with relation to FIGS. 14A to 14F. The lower portion 41 of the deformable substrate 3 may be formed as described with relation to FIGS. 13A to 13O. The lower portion 41 of the deformable substrate 3 may comprise a curved support structure 7 and protruding sensors 21, 23.

In the example of FIG. 15 the upper portion 43 and the lower portion 41 are bonded in a roll-to-roll process after brief plasma treatment to promote bonding.

FIGS. 16A and 16B illustrate the effect that parasitic capacitance may have within example apparatus. In some example apparatus 1 there may be parasitic capacitance between the protruding electrodes 21, 23, of the apparatus 1. In some example apparatus 1 there may be parasitic capacitance between the second portions 25, 28 of the protruding electrodes 21, 23, which extend along the edges of the curved support structure 7. The parasitic capacitance may reduce the sensitivity of the apparatus 1.

The parasitic capacitance will not change when the apparatus 1 is deformed. However the capacitive sensor 31 may be arranged so that the parasitic capacitance between the electrodes 21, 23 is at least an order of magnitude lower than the measured capacitance of the capacitive sensor 31.

FIG. 16A illustrates an example curved support structure 7 with a geometry that may be used in examples of the disclosure. The geometry of the curved support structure 7 may be selected to provide good strain capabilities so that when a large stress is applied to the apparatus 1 only a small amount of strain is present in the curved support structure 7. The dimensions of the curved support structure in FIG. 16A are radius of curvature 200 µm, track width 20 µm, arc angle of each section 270 degrees. It is to be appreciated that other dimensions may be used in other examples.

The curved support structure 7 supports a first protruding electrode 21 and a second protruding electrode 23. The first protruding electrode 21 and a second protruding electrode 23 each comprise first portions 24, 27 which protrude from a side of the curved support structure 7. The first protruding electrode 21 and a second protruding electrode 23 each comprise second portions 25, 28 which extend along an edge of the curved support structure 7. The dimensions of the first portions 24, 27 in FIG. 16A are length 150 µm and width 100 µm. The two protruding electrodes 21, 23 have thickness of 100 nm and the track width of the second portions 25, 28 which extend along the curved support structure 7 is 1 µm.

FIG. 16B shows the ratio of the parasitic capacitance to the capacitance of the capacitive sensor 31 as a function of the separation d between the protruding electrode 21, 23 and the overlain electrode 33. In the example of FIG. 16B the parasitic capacitance is between the second portions 25, 28 of the protruding electrodes 21, 23, which extend along the edges of the curved support structure 7.

It can be seen from FIG. 16B that when there is a large separation d of 300 µm the capacitance of the capacitive sensor 31 is an order of magnitude larger than the parasitic capacitance. The large gap allows for greater freedom for bending and/or flexing and/or otherwise deforming the apparatus 1.

When there is a gap of separation d of 50 µm the capacitance of the capacitive sensor 31 is two orders of magnitude larger than the parasitic capacitance. This may provide for a more sensitive capacitive sensor 31.

In the examples of FIGS. 16A and 16B the capacitance values have been calculated assuming an air gap between the parts of the capacitive sensor 31. In the examples described above at least a part of this gap will consist of a thin elastomer film which supports the overlaying electrode 33. The elastomer will have a larger dielectric constant than air. As an example, PDMS has a dielectric constant of 2.3-2.8 times that of air. This will result in an increase in the capacitance of the capacitive sensor 31. The ratio of the parasitic capacitance to the capacitance of the capacitive sensor 31 may be improved further by increasing the dimensions of the first portions 24, 27 of the protruding electrodes 21, 23 and/or introducing a dielectric medium on their surface.

Examples of the disclosure provide a deformable apparatus 1 which can be configured to detect deformation of the apparatus 1. An array 61 of capacitive sensors 31 may be incorporated within the apparatus 1 to detect different types and/or direction of deformations. This enables accurate information about the deformation of the apparatus 1 to be obtained.

The capacitive sensors 31 may be arranged so that an array 61 of capacitive sensors 31 can be read by commercially available electronics. The array 61 of capacitive sensors 31 may comprise any number of capacitive sensors 31. This may enable information to be obtained from a large number of capacitive sensors 31.

In examples of the apparatus 1 the curved support structure 7 is coupled to the deformable substrate 3 via the at least one support 5 which enables the curved support structure 7 to be positioned spaced from the deformable substrate 3. When a user applies a force to the deformable substrate 3 this may cause a change in size or shape of the deformable substrate 3. As the curved support structure 7 is not directly coupled to the deformable substrate 3 the forces applied to the deformable substrate are not also applied to the curved support structure 7. This means that the conductive portion does not bend or change size or shape in the same way that the deformable substrate does. This may reduce the amount of stress within the curved support structure 7 and reduce the likelihood of failure due to fatigue.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the present disclosure have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a deformable substrate;
   a curved support structure;
   at least one support configured to space the curved support structure from the substrate so that when the deformable substrate is deformed the curved support structure is not deformed in the same way; and
   a capacitive sensor comprising a first protruding electrode and a second protruding electrode that are both capacitively coupled to an overlaying electrode;
   wherein the first and second protruding electrodes protrude from at least one side of the curved support structure.

2. An apparatus as claimed in claim 1 comprising a plurality of capacitive sensors comprising a protruding electrode capacitively coupled to an overlaying electrode wherein different capacitive sensors within the apparatus are configured to detect different types of deformation of the apparatus.

3. An apparatus as claimed in claim 1 wherein the first protruding electrode protrudes from a first side of the curved support structure and the second protruding electrode protrudes from a second side of the curved support structure.

4. An apparatus as claimed in claim 1 wherein the first protruding electrode protrudes from a first side of the curved support structure and the second protruding electrode also protrudes from the first side of the curved support structure.

5. An apparatus as claimed in claim 1 wherein the first and second protruding electrodes are provided in the same plane and the overlaying electrode is provided in a different plane to the first protruding electrode and second protruding electrode.

6. An apparatus as claimed in claim 1 wherein the first and second protruding electrodes are suspended over the deformable substrate.

7. An apparatus as claimed in claim 1 wherein the overlaying electrode is embedded in an overlaying elastomeric layer.

8. An apparatus as claimed in claim 1 wherein the first and second overlaying electrodes are larger than the protruding electrodes.

9. An apparatus as claimed in claim 1 wherein the overlaying electrode is either rigid or deformable.

10. An apparatus as claimed in claim 1 wherein the deformable substrate forms a cavity in which the curved support structure and the first and second protruding electrodes are provided.

11. An apparatus as claimed in claim 1 wherein a radius of curvature of the curved support structure is parallel to a plane of the deformable substrate.

12. An apparatus as claimed in claim 1 wherein the curved support structure has a serpentine shape wherein the serpentine shape comprises a plurality of loops such that a loop which extends to a left hand side is followed by a loop which extends to a right hand side.

13. An apparatus as claimed in claim 1 wherein the deformable substrate is configured to be deformed in response to a force applied by a user.

14. An apparatus comprising:
    a deformable substrate;
    a curved support structure;
    at least one support configured to space the curved support structure from the substrate so that when the deformable substrate is deformed the curved support structure is not deformed in the same way; and
    a plurality of capacitive sensors comprising a protruding electrode capacitively coupled to an overlaying electrode wherein different capacitive sensors within the apparatus are configured to detect different types of deformation of the apparatus;
    wherein the protruding electrode protrudes from a side of the curved support structure.

15. A method comprising:
    providing a deformable substrate;
    providing a curved support structure;
    providing at least one support configured to space the curved support structure from the deformable substrate so that when the deformable substrate is deformed the curved support structure is not deformed in the same way; and
    providing a capacitive sensor comprising a first protruding electrode and a second protruding electrode that are both capacitively coupled to an overlaying electrode;

wherein the first and second protruding electrodes protrude from at least one side of the curved support structure.

16. A method as claimed in claim 15 comprising providing a plurality of capacitive sensors comprising a protruding electrode capacitively coupled to an overlaying electrode, wherein different capacitive sensors within the apparatus are configured to detect different types of deformation of the apparatus.

17. A method as claimed in claim 15 wherein the first protruding electrode protrudes from a first side of the curved support structure and the second protruding electrode protrudes from a second side of the curved support structure.

18. A method as claimed in claim 15 wherein the first and second protruding electrodes are provided in the same plane, wherein the overlaying electrode is provided in a different plane to the first protruding electrode and second protruding electrode.

* * * * *